United States Patent
Chihara et al.

(10) Patent No.: US 9,761,265 B2
(45) Date of Patent: Sep. 12, 2017

(54) DISC DEVICE AND DISC SEPARATION METHOD

(71) Applicant: Panasonic Intellectual Property Management Co., Ltd., Osaka (JP)

(72) Inventors: Yasue Chihara, Osaka (JP); Masanori Ohnishi, Osaka (JP); Norikatsu Yoshida, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/420,447

(22) Filed: Jan. 31, 2017

(65) Prior Publication Data

US 2017/0140787 A1 May 18, 2017

Related U.S. Application Data

(63) Continuation of application No. PCT/JP2015/002063, filed on Apr. 14, 2015.

(30) Foreign Application Priority Data

Aug. 5, 2014 (JP) ................................. 2014-159652

(51) Int. Cl.
G11B 17/26 (2006.01)
G11B 17/22 (2006.01)

(52) U.S. Cl.
CPC .......... *G11B 17/228* (2013.01); *G11B 17/223* (2013.01); *G11B 17/26* (2013.01)

(58) Field of Classification Search
None
See application file for complete search history.

(56) References Cited

U.S. PATENT DOCUMENTS 5,793,717 A 8/1998 Morita et al.
6,226,253 B1 * 5/2001 Ogawa ................. G11B 17/223
369/30.9

(Continued)

FOREIGN PATENT DOCUMENTS

JP 2000-117553 A 4/2000
JP 2013-251033 A 12/2013

(Continued)

OTHER PUBLICATIONS

International Search Report for corresponding International Application No. PCT/JP2015/002063 dated Jun. 2, 2015.

*Primary Examiner* — Will J Klimowicz
(74) *Attorney, Agent, or Firm* — Renner Otto Boisselle & Sklar

(57) ABSTRACT

A disc device according to the present disclosure is a disc device for supplying a disc to each of a plurality of disc drives, and includes a carrier for retaining a plurality of discs in a stacked state, for separating one disc from the retained plurality of discs above a tray that is ejected from an arbitrary disc drive, and for placing the separated one disc on the tray. The carrier includes a first support claw that is capable of moving forward and backward below the plurality of discs, a second support claw that is capable of moving forward and backward into and out of a gap between a bottom disc and a disc that is adjacent to the bottom disc, among the plurality of discs, and a separation claw that is capable of moving forward and backward into and out of the gap and of pushing the bottom disc downward, where the bottom disc is separated from the retained plurality of discs by moving the first support claw, the second support claw, and the separation claw forward and backward, and pushing the bottom disc downward by the separation claw.

11 Claims, 41 Drawing Sheets

(56) References Cited

U.S. PATENT DOCUMENTS

| | | | |
|---|---|---|---|
| 2007/0267881 A1* | 11/2007 | Arai | B25J 15/10 294/93 |
| 2013/0223969 A1 | 8/2013 | Nakano | |
| 2013/0326548 A1 | 12/2013 | Chihara et al. | |
| 2013/0326549 A1 | 12/2013 | Nishi et al. | |
| 2013/0343855 A1 | 12/2013 | Nishi et al. | |
| 2014/0003899 A1* | 1/2014 | Okamoto | G11B 33/0444 414/618 |
| 2015/0024161 A1 | 1/2015 | Higaki et al. | |
| 2015/0074692 A1* | 3/2015 | Yoshida | G11B 23/0323 720/615 |

FOREIGN PATENT DOCUMENTS

| | | |
|---|---|---|
| JP | 2014-13639 A | 1/2014 |
| JP | 2014-26713 A | 2/2014 |
| WO | WO 2012/056613 A1 | 5/2012 |

\* cited by examiner

DISC DEVICE AND DISC SEPARATION METHOD

BACKGROUND

1. Technical Field

The present disclosure relates to a disc device and a disc separation method for separating discs, such as disc-shaped information storage media such as CDs (Compact Discs) and DVDs (Digital Versatile Disks), one by one from a plurality of discs that are stacked together, and for supplying the discs to a plurality of disc drives, respectively.

2. Description of the Related Art

Conventionally, as this type of disc device, a device disclosed in Unexamined Japanese Patent Publication No. 2014-13639 is known, for example.

The disc device of Unexamined Japanese Patent Publication No. 2014-13639 includes a carrier which holds a plurality of discs in a stacked state, which separates one disc from the retained plurality of discs at a position above a tray that is ejected from an arbitrary disc drive, and which places the separated disk on the tray.

The carrier includes a first support claw for supporting a plurality of discs by coming into contact with a bottom disc of the plurality of discs, and a second support claw which is provided above the first support claw by a thickness of substantially one disc and which is capable of moving back and forth in a gap between the plurality of discs.

According to the disc device of Unexamined Japanese Patent Publication No. 2014-13639, the second support claw is moved forward into a gap between a bottom disc and a disc that is adjacent to the bottom disc, in a state where the first support claw is in contact with the bottom disc and is supporting a plurality of discs. Discs above the bottom disc may thereby be supported by the second support claw. In this state, the first support claw is moved away from the bottom disc. Accordingly, the bottom disc is no longer supported and falls automatically. On the other hand, discs above the bottom disc are supported by the second support claw. The disc device of the Unexamined Japanese Patent Publication No. 2014-13639 is configured to separate one disc from a plurality of discs in the above manner.

SUMMARY

However, when a plurality of discs are stacked together, so-called "sticking" where adjacent discs get stuck due to static electricity or the like occurs, and discs are sometimes not easily separated. Particularly, in a case where the stacked discs are double-sided discs having recording layers on both surfaces, surfaces that are mirror finished due to optical properties face each other, and "sticking" is likely to occur.

The disc device of Unexamined Japanese Patent Publication No. 2014-13639 is configured such that the bottom disc is separated by falling automatically, and thus, when "sticking" occurs, the bottom disc is possibly not separated.

The present disclosure provides a disc device and a disc separation method which allow one disc to be more reliably separated from a plurality of discs.

A disc device according to the present disclosure is a disc device for supplying a disc to each of a plurality of disc drives, and includes a carrier for holding a plurality of discs in a stacked state, for separating one disc from the retained plurality of discs above a tray that is ejected from an arbitrary disc drive, and for placing the separated one disc on the tray. The carrier includes a first support claw that is capable of moving forward and backward below the plurality of discs, a second support claw that is capable of moving forward and backward into and out of a gap between a bottom disc and a disc that is adjacent to the bottom disc, among the plurality of discs, and a separation claw that is capable of moving forward and backward into and out of the gap and of pushing the bottom disc downward, where the bottom disc is separated from the retained plurality of discs by moving the first support claw, the second support claw, and the separation claw forward and backward, and pushing the bottom disc downward by the separation claw.

A disc separation method according to the present disclosure is a disc separation method for separating one disc from a plurality of discs that are stacked together, and includes moving a second support claw and a separation claw forward into a gap between a bottom disc and a disc that is adjacent to the bottom disc, among the plurality of discs, and then retracting a first support claw supporting the plurality of discs from below from below the plurality of discs, and separating the bottom disc from the plurality of discs by moving the separation claw relative to the second support claw and pushing the bottom disc downward.

According to the disc device and the disc separation method of the present disclosure, one disc may be reliably separated from a plurality of discs.

DETAILED DESCRIPTION

Hereinafter, exemplary embodiments will be described in detail with reference to the drawings as appropriate. However, unnecessarily detailed description may be omitted. For example, detailed description of already well-known matters and repeated description of substantially the same structure may be omitted. All of such omissions are intended to facilitate understanding by those skilled in the art by preventing the following description from becoming unnecessarily redundant.

Moreover, the following description and the appended drawings are provided only for the purpose of helping those skilled in the art sufficiently understand the present disclosure, and therefore are not intended to limit the subject matters of the appended claims in any way.

Exemplary Embodiment

Figure 1:
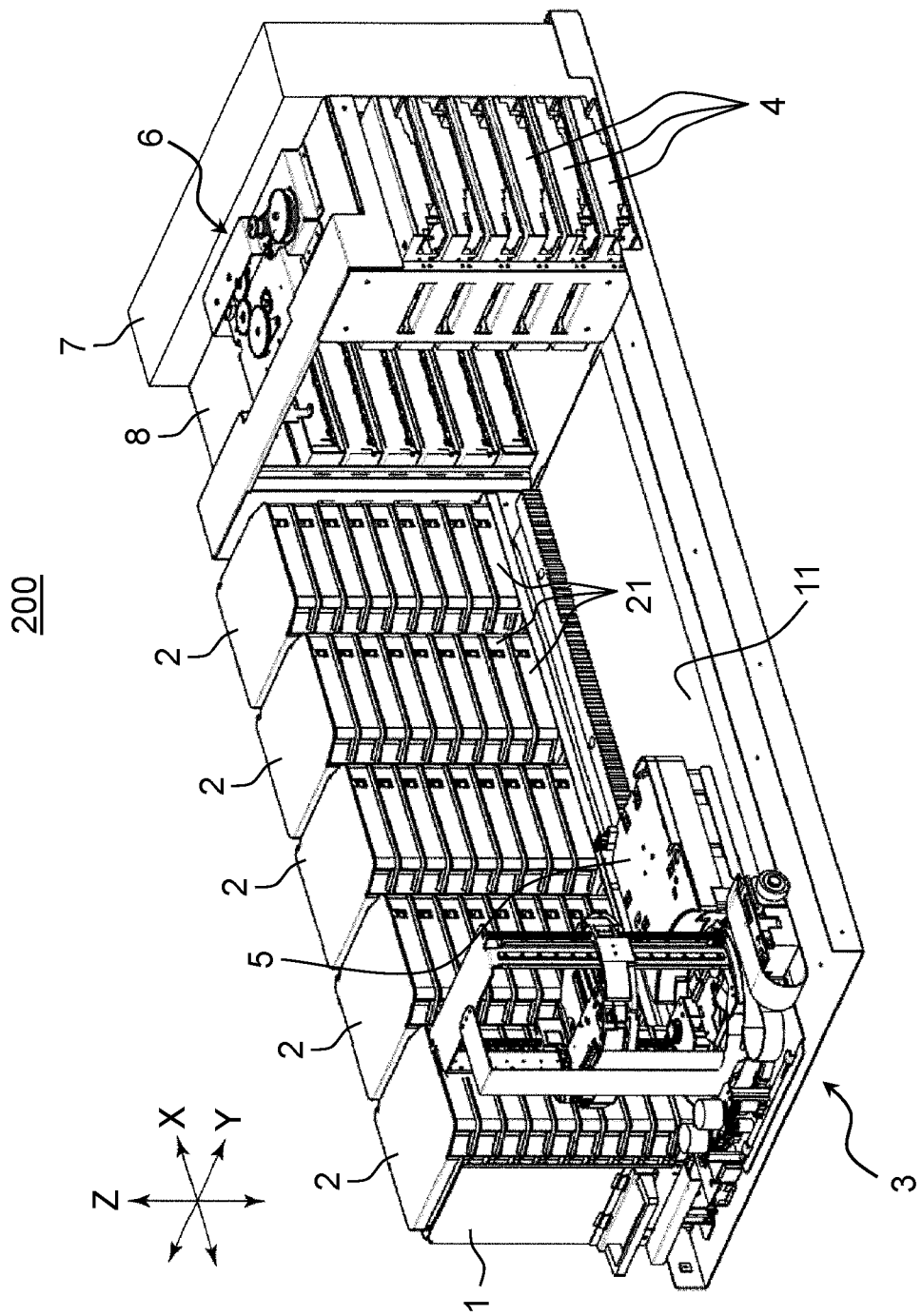
FIG. 1 is a perspective view showing a schematic configuration of a disc device according to an exemplary embodiment of the present disclosure.

FIG. 1 is a perspective view showing a schematic configuration of a disc device according to an exemplary embodiment of the present disclosure. Additionally, in the present exemplary embodiment, the bottom left side in FIG. 1 is referred to as the "device front side", the top right side in FIG. 1 is referred to as the "device rear side", and the up-down direction, Z direction, in FIG. 1 is referred to the "device height direction".

First, an overall configuration of the disc device according to the present exemplary embodiment will be described with reference to FIG. 1.

Disc device 200 according to the present exemplary embodiment includes two magazine stockers 1. Two magazine stockers 1 are provided on bottom chassis 11 in a manner facing each other in device width direction Y. Additionally, in FIG. 1, of two magazine stockers 1, magazine stocker 1 on the near side is omitted from the drawing. Also, FIG. 1 does not show a top plate and a partition plate of magazine stocker 1.

A plurality of magazines 2 are stored in each of two magazine stockers 1. In FIG. 1, one magazine stocker 1 stores a total of 45 magazines 2, five in the horizontal direction and nine in the vertical direction.

Figure 2A:
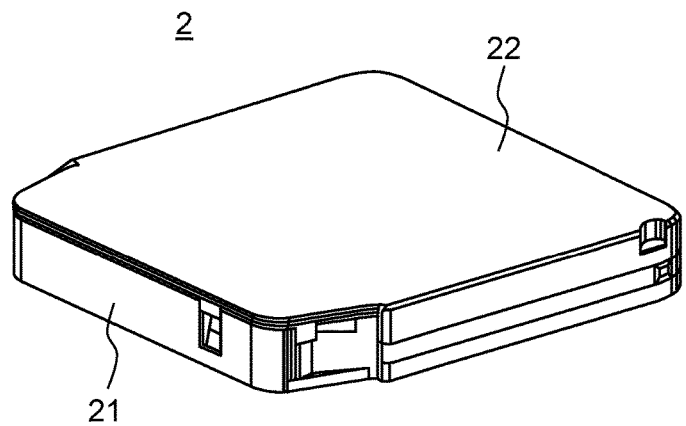
FIG. 2A is a perspective view of a magazine provided to the disc device in FIG. 1.
Figure 2B:
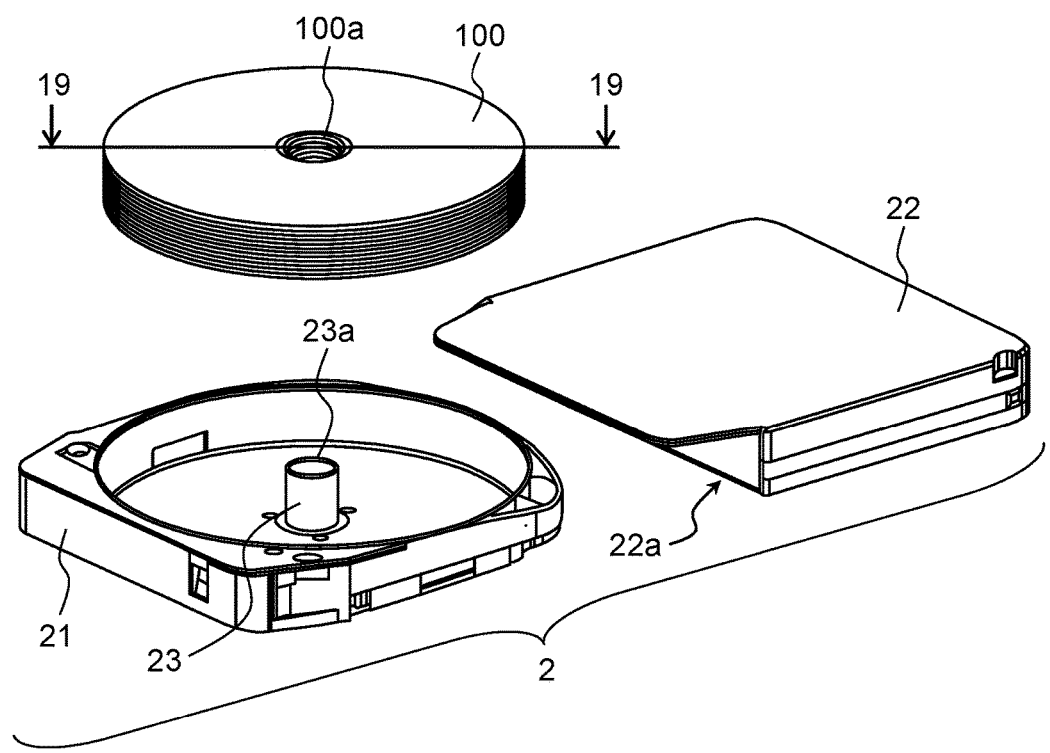
FIG. 2B is an exploded perspective view of the magazine in FIG. 2A.

Now, magazine 2 will be described in detail. FIG. 2A is a perspective view of magazine 2 provided to disc device 200 in FIG. 1, and FIG. 2B is an exploded perspective view of magazine 2 in FIG. 2A. As shown in FIGS. 2A and 2B, magazine 2 includes magazine tray 21 for storing a plurality of discs 100, twelve in the present exemplary embodiment, and case 22, having a substantially rectangular parallelepiped shape, for storing magazine tray 21. As shown in FIG. 2B, at a front surface (one side surface) of case 22, opening 22a for allowing insertion and removal of magazine tray 21 is provided.

Magazine tray 21 is formed to have a substantially rectangular outer shape in a plan view. A plurality of discs 100 are stored in magazine tray 21 while being stacked in close contact with one another. Magazine tray 21 is provided with core rod 23 which is to be inserted in center hole 100a provided to each of the plurality of discs 100 and which restricts movement of each disc 100 in the plane direction. Core rod 23 prevents each disc 100 from being damaged by movement of each disc 100 in the plane direction. Core rod 23 is provided with engaging portion 23a for engaging with spindle head 66b of disc chuck unit 62 described later.

Disc device 200 in FIG. 1 will be described again. Picker 3 for drawing out magazine tray 21 from one magazine 2 selected from the plurality of magazines 2, and for holding magazine tray 21 which is drawn out is provided between two magazine stockers 1.

Picker 3 is structured to convey retained magazine tray 21 to near a plurality of disc drives 4, twelve in the present exemplary embodiment, disposed at the device rear side. Lifter 5, described later, is integrally provided to picker 3 so as to push out a plurality of discs 100 from magazine tray 21.

Disc drive 4 performs recording or reading of data on disc 100. Moreover, disc drive 4 is a tray-type disc drive that loads a disc by using a tray. In FIG. 1, the plurality of disc drives 4 are divided into two, stacked in groups of six in the device height direction, and are disposed next to one or the other of magazine stockers 1 at the device rear side. Carrier 6 is provided between a plurality of disc drives 4 that are disposed next to one magazine stocker 1 and a plurality of disc drives 4 disposed next to the other magazine stocker 1.

Carrier 6 is structured to hold a plurality of discs 100 pushed out by lifter 5, described above, in a stacked state, to separate one disc 100 from the retained plurality of discs 100 at above tray 4a, described later, that is ejected from arbitrary disc drive 4, and to place separated disc 100 on tray 4a.

On the further device rear side than carrier 6 and the plurality of disc drives 4, an electric circuit and power supply 7 are provided. The electric circuit and power supply 7 are provided with a controller for controlling operations of motors and the like of picker 3, disc drive 4, carrier 6 and the like. The controller is connected to a host computer that manages data, for example. The host computer sends a command to the controller to perform operation such as writing or reading of data on specified magazine 2, based on an instruction from an operator. The controller controls operations of picker 3, disc drive 4, carrier 6 and the like according to the command.

The plurality of disc drives 4 are stored in housing 8, and carrier 6 is provided to housing 8.

Figure 3:
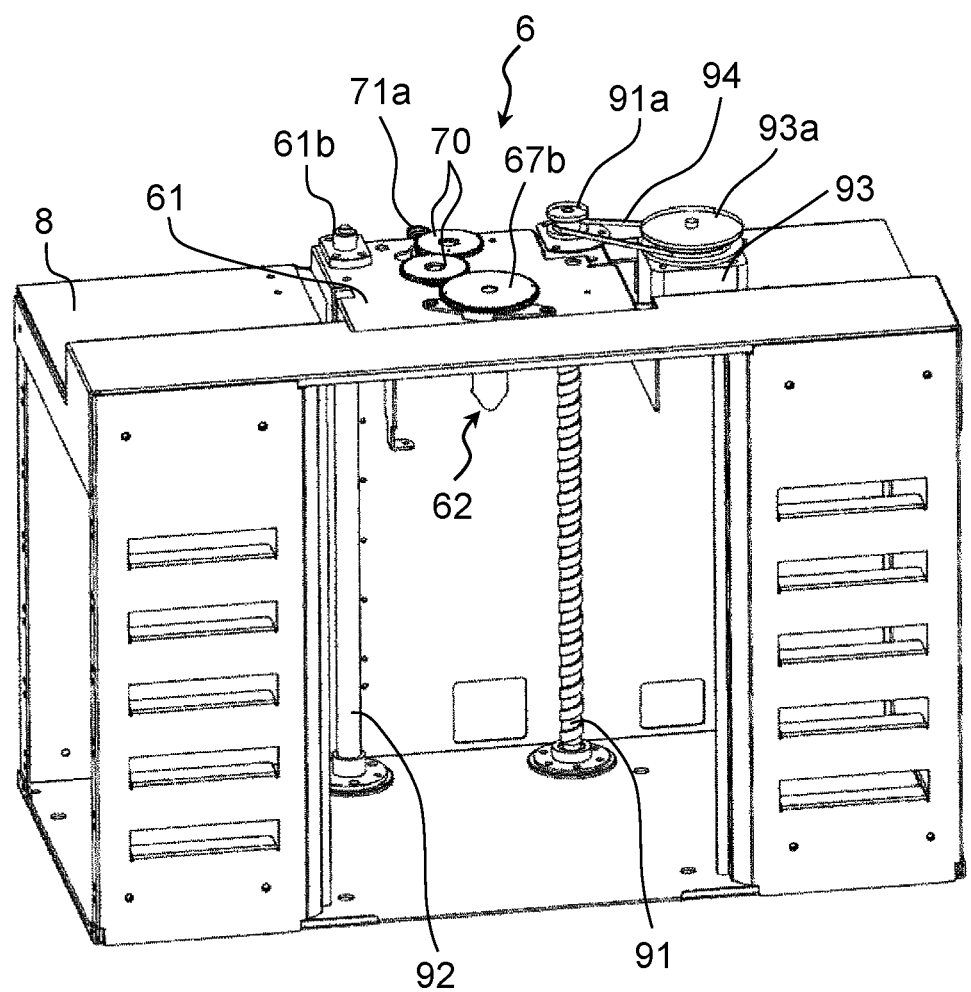
FIG. 3 is a perspective view of a carrier provided to the disc device in FIG. 1.
Figure 4:
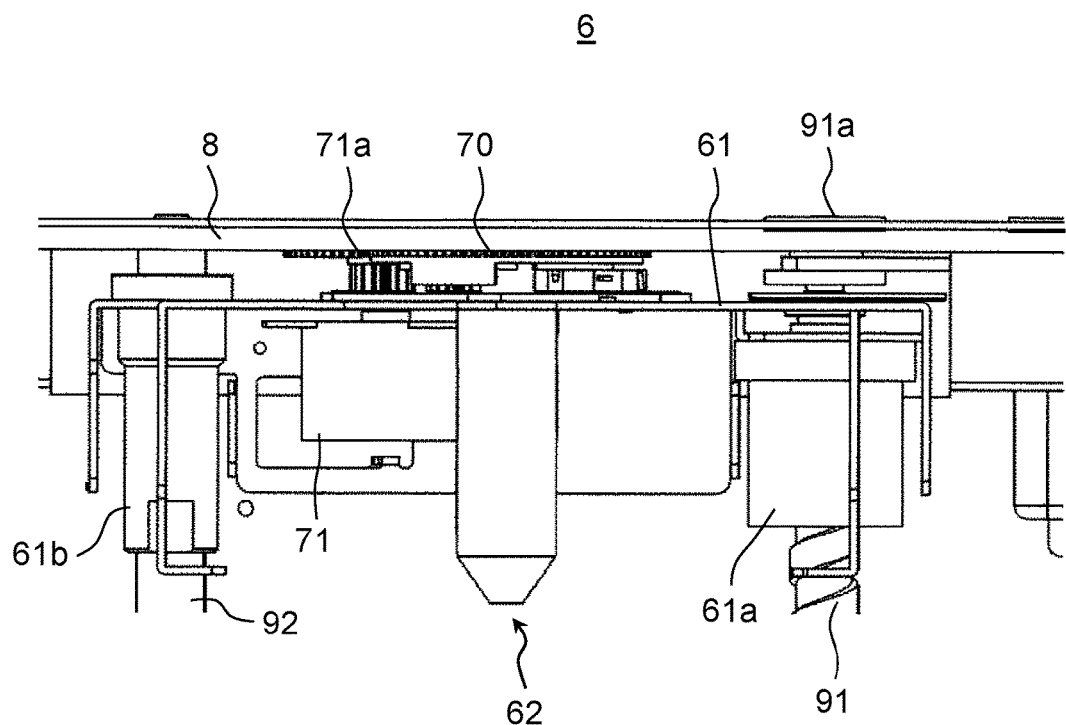
FIG. 4 is a partial enlarged side view of the carrier in FIG. 3.

Next, the structure of carrier 6 will be described in detail. FIG. 3 is a perspective view of carrier 6 provided to disc device 200 in FIG. 1. FIG. 4 is a partial enlarged side view of carrier 6 in FIG. 3. FIGS. 3 and 4 are diagrams seen from the device rear side.

As shown in FIGS. 3 and 4, carrier 6 includes moving base 61 which moves in the device height direction, and disc chuck unit 62 which is provided to moving base 61.

As shown in FIG. 4, moving base 61 is connected to ball screw 91 via bush 61a, and is also connected to guide shaft 92 via guide shaft bearing 61b. Ball screw 91 and guide shaft 92 are provided in a manner extending in the device height direction.

As shown in FIG. 3, pulley 91a is attached at an upper end portion of ball screw 91. Also, carrier motor 93 for generating a driving force to cause ball screw 91 to turn about the axis is provided to housing 8. Pulley 93a is attached to a drive shaft of carrier motor 93. Belt 94 is wrapped around pulley 91a and pulley 93a.

When carrier motor 93 is driven, the driving force of carrier motor 93 is transferred to ball screw 91 via pulley 93a, belt 94, and pulley 91a, and ball screw 91 is turned around the axis. Moving base 61 is guided by ball screw 91 and guide shaft 92 to move in the device height direction by the turning of ball screw 91. Carrier motor 93 is connected to the controller of the electric circuit and power supply 7, and is driven under the control of the controller.

Disc chuck unit 62 is structured to hold a plurality of discs 100 pushed out by lifter 5, described later, and to separate the retained plurality of discs 100 one by one. Detailed structures of moving base 61 and disc chuck unit 62 will be described later.

As shown in FIG. 3, cam gear 67b is meshed with relay gear 70. Relay gear 70 is structured from two gears, for example, and is provided to moving base 61 in a manner capable of rotation.

Furthermore, as shown in FIG. 4, relay gear 70 is meshed with motor gear 71a which is press fitted in a drive shaft of disc chuck motor 71 provided to moving base 61.

As shown in FIG. 3 or 4, when disc chuck motor 71 is driven, a driving force of disc chuck motor 71 is transferred to cam gear 67b via motor gear 71a and relay gear 70, and cam gear 67b and camshaft 67a, described later, are rotated. Disc chuck motor 71 is connected to the controller of the electric circuit and power supply 7, and is driven under the control of the controller.

Next, an operation of loading a plurality of discs 100 stored in arbitrary magazine tray 21 into disc drive 4, and an operation of collecting disc 100 loaded in disc drive 4 will be described with reference to FIGS. 5 to 14.

Figure 5:
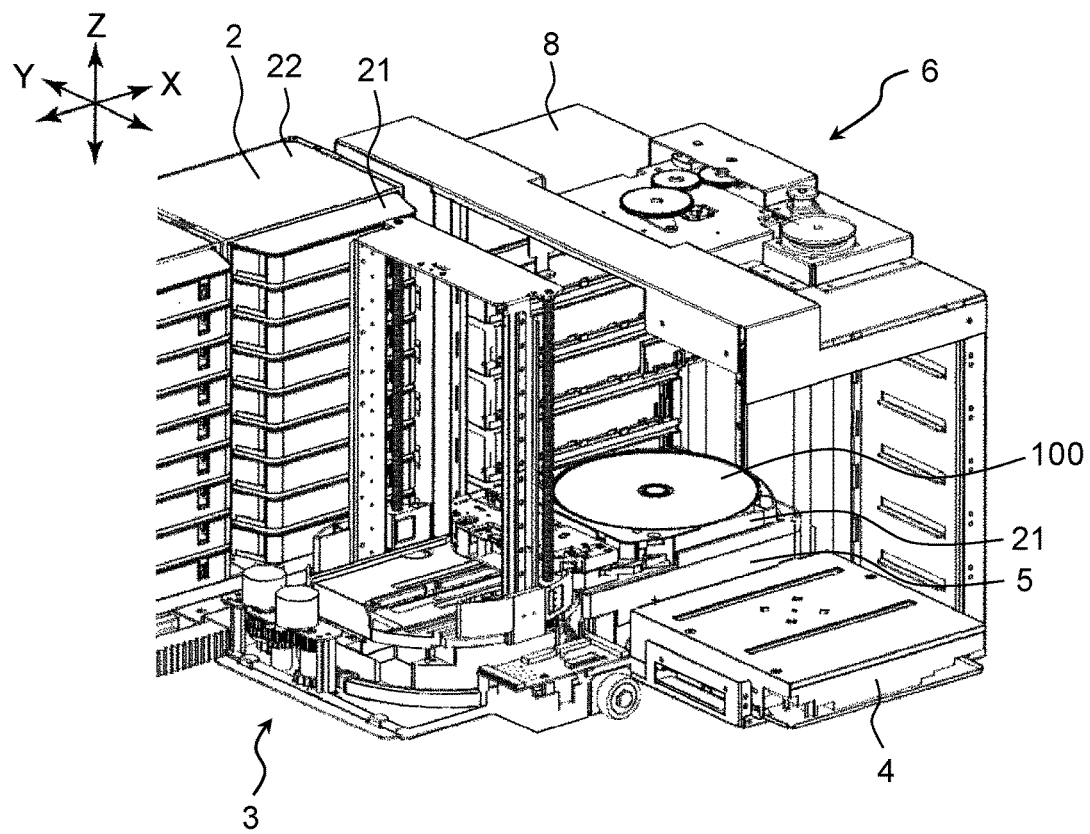
FIG. 5 is a first diagram describing a loading operation of a plurality of discs stored in an arbitrary magazine tray into a disc drive, and a collection operation.

As shown in FIG. 5, picker 3 places retained magazine tray 21 at a predetermined position at a top portion of lifter 5, and conveys magazine tray 21 to near a plurality of disc drives 4. In FIG. 5, disc drives 4 on the near side are not drawn.

Figure 6:
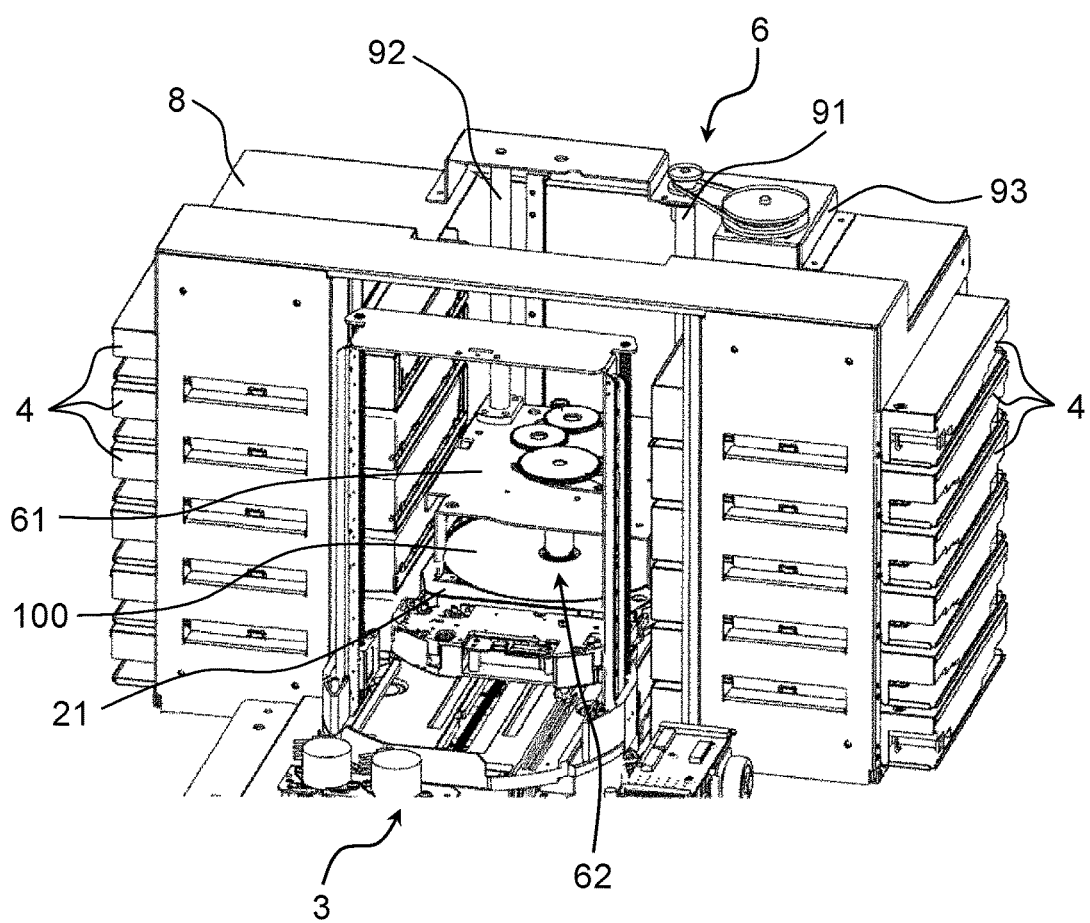
FIG. 6 is a second diagram describing the loading operation of a plurality of discs stored in an arbitrary magazine tray into the disc drive, and the collection operation.

As shown in FIG. 6, when magazine tray 21 is placed at a predetermined position at the top portion of lifter 5, moving base 61 is lowered to near magazine tray 21. Tip end portion of disc chuck unit 62 is thereby engaged with engaging portion 23a of core rod 23 that is provided to magazine tray 21 described with reference to FIG. 2B, and disc chuck unit 62 and core rod 23 are made coaxial. In this state, lifter 5 pushes out a plurality of discs 100 from magazine tray 21.

Figure 7:
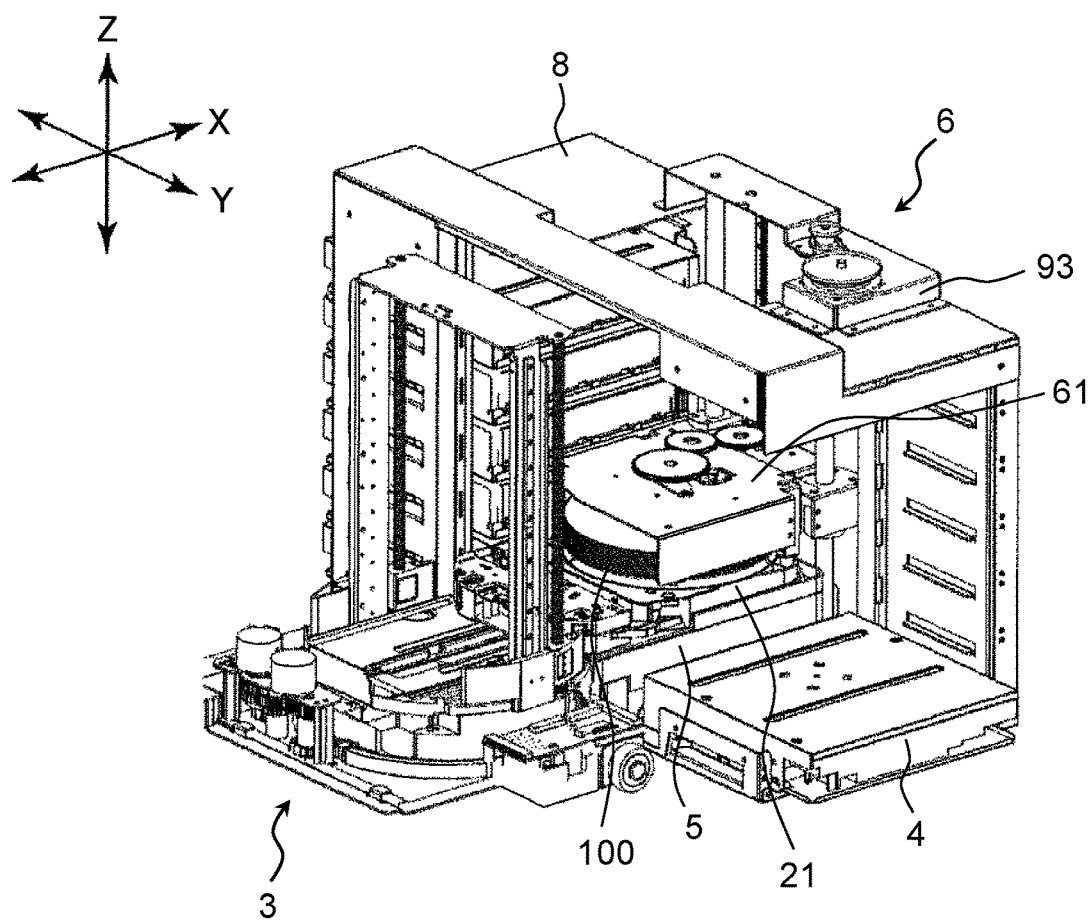
FIG. 7 is a third diagram describing the loading operation of a plurality of discs stored in an arbitrary magazine tray into the disc drive, and the collection operation.

Accordingly, as shown in FIG. 7, disc chuck unit 62 is made to hold the plurality of discs 100 which have been pushed out. When all of the plurality of discs 100 which have been pushed out are held by disc chuck unit 62, moving base 61 is raised by being guided by ball screw 91 and guide shaft 92. Due to this rise, engagement between the tip end portion of disc chuck unit 62 and engaging portion 23a of core rod 23 is released.

Figure 8:
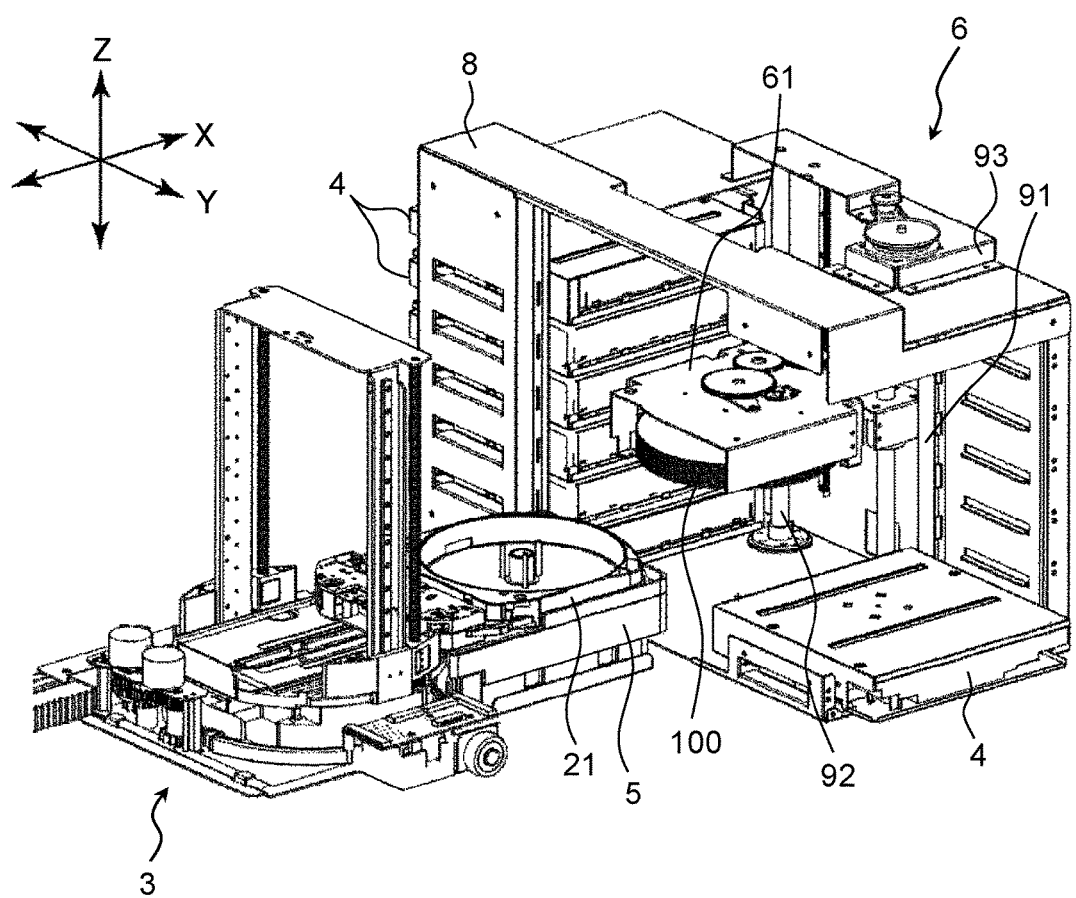
FIG. 8 is a fourth diagram describing the loading operation of a plurality of discs stored in an arbitrary magazine tray into the disc drive, and the collection operation.

Then, as shown in FIG. 8, picker 3 is moved to the device front side, and magazine tray 21 is retracted from near disc drives 4.

Figure 9:
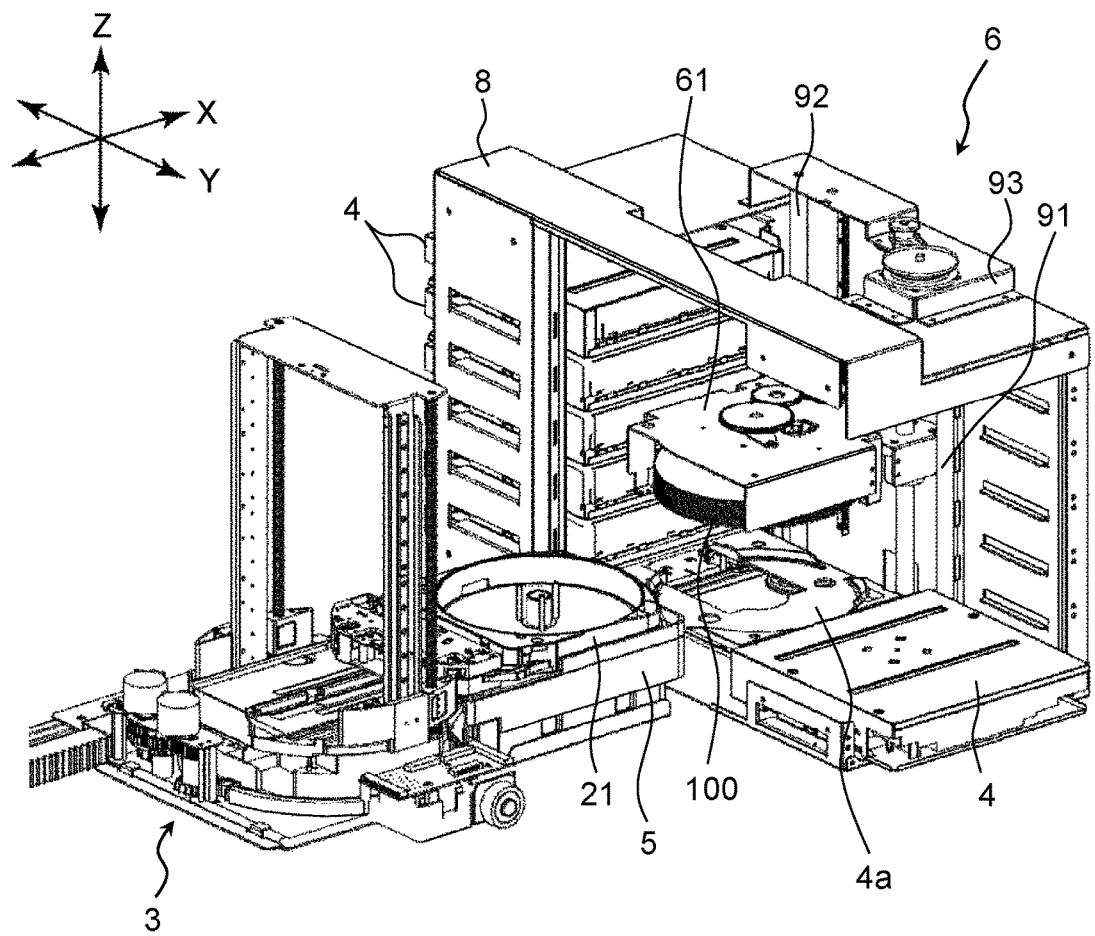
FIG. 9 is a fifth diagram describing the loading operation of a plurality of discs stored in an arbitrary magazine tray into the disc drive, and the collection operation.

Then, as shown in FIG. 9, tray 4a of one of disc drives 4 at the lowest level (first level) is ejected under the control of the controller of the electric circuit and power supply 7.

Figure 10:
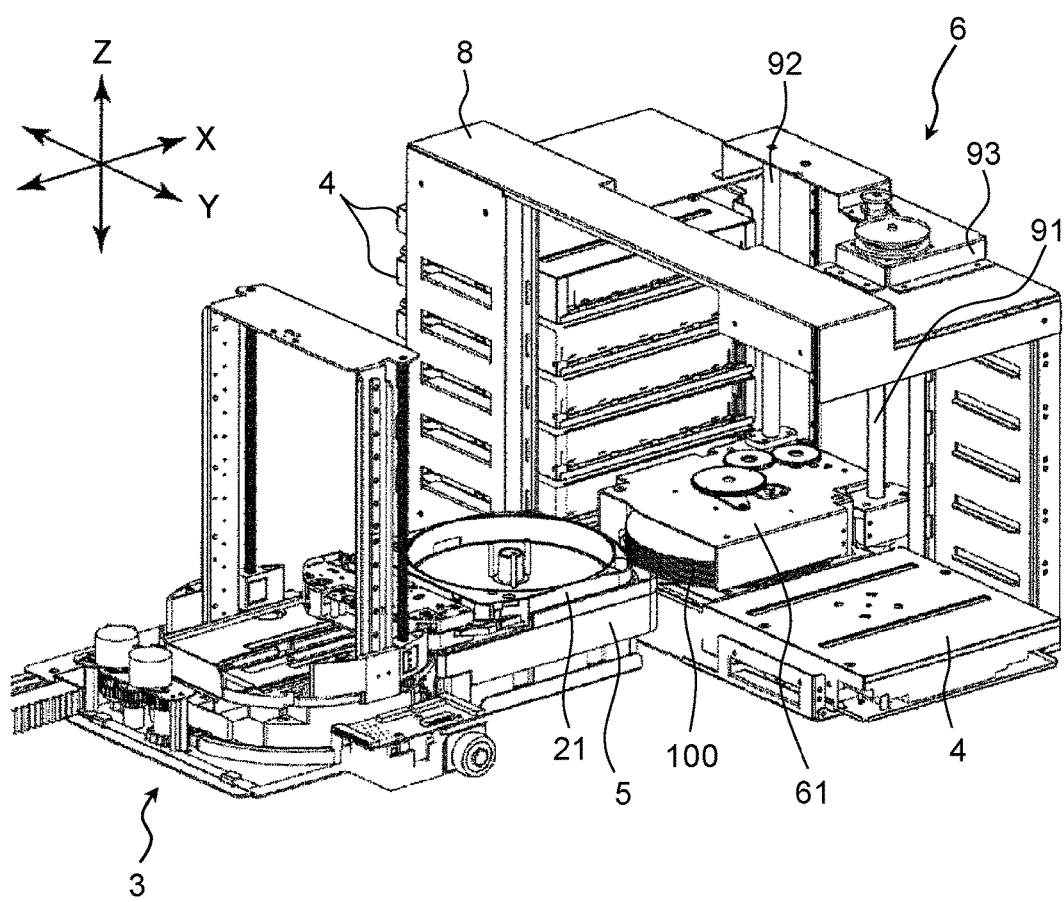
FIG. 10 is a sixth diagram describing the loading operation of a plurality of discs stored in an arbitrary magazine tray into the disc drive, and the collection operation.

Then, as shown in FIG. 10, moving base 61 is lowered such that the plurality of discs 100 retained by disc chuck unit 62 are positioned above, for example, immediately above, tray 4a. Then, bottom disc 100 is separated from other discs 100 by disc chuck unit 62, and is placed on tray 4a.

Figure 11:
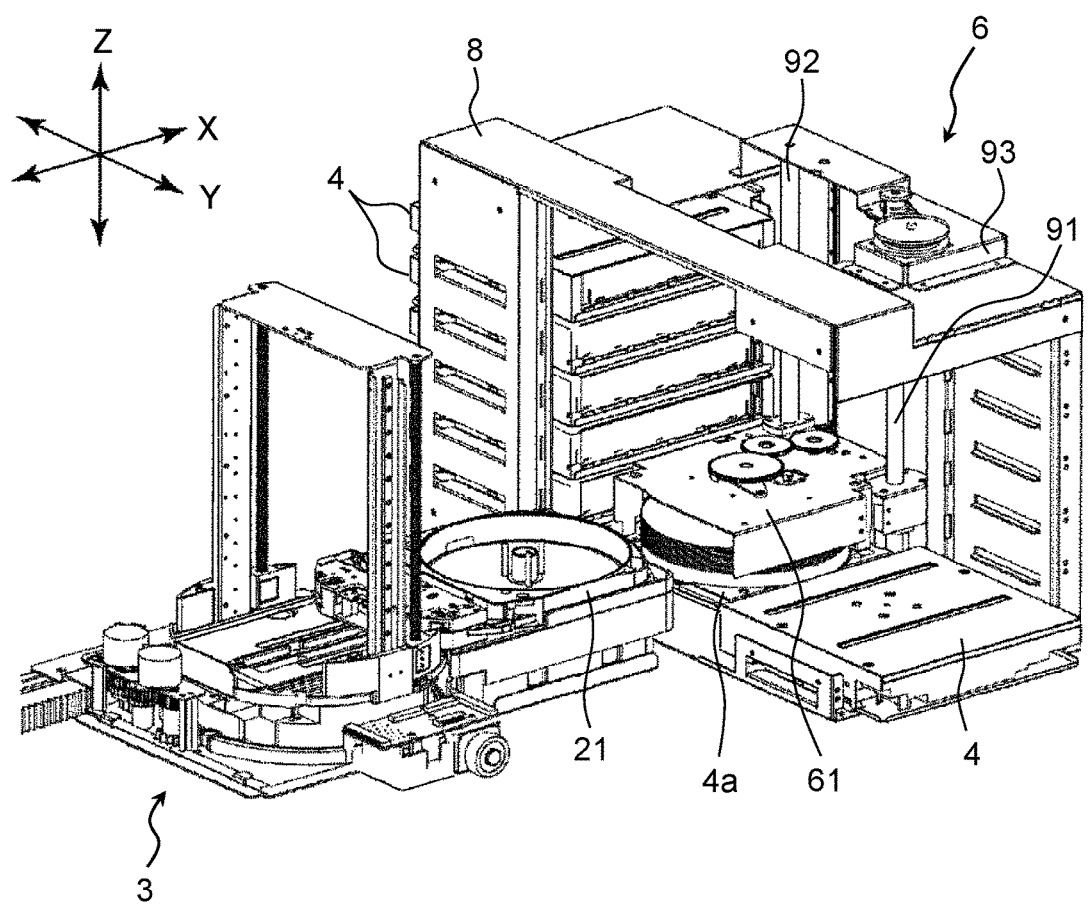
FIG. 11 is a seventh diagram describing the loading operation of a plurality of discs stored in an arbitrary magazine tray into the disc drive, and the collection operation.

As shown in FIG. 11, bottom disc 100 is placed on tray 4a. When bottom disc 100 is placed on tray 4a, moving base 61 is raised without disc chuck unit 62 and tray 4a coming into contact with each other.

Figure 12:
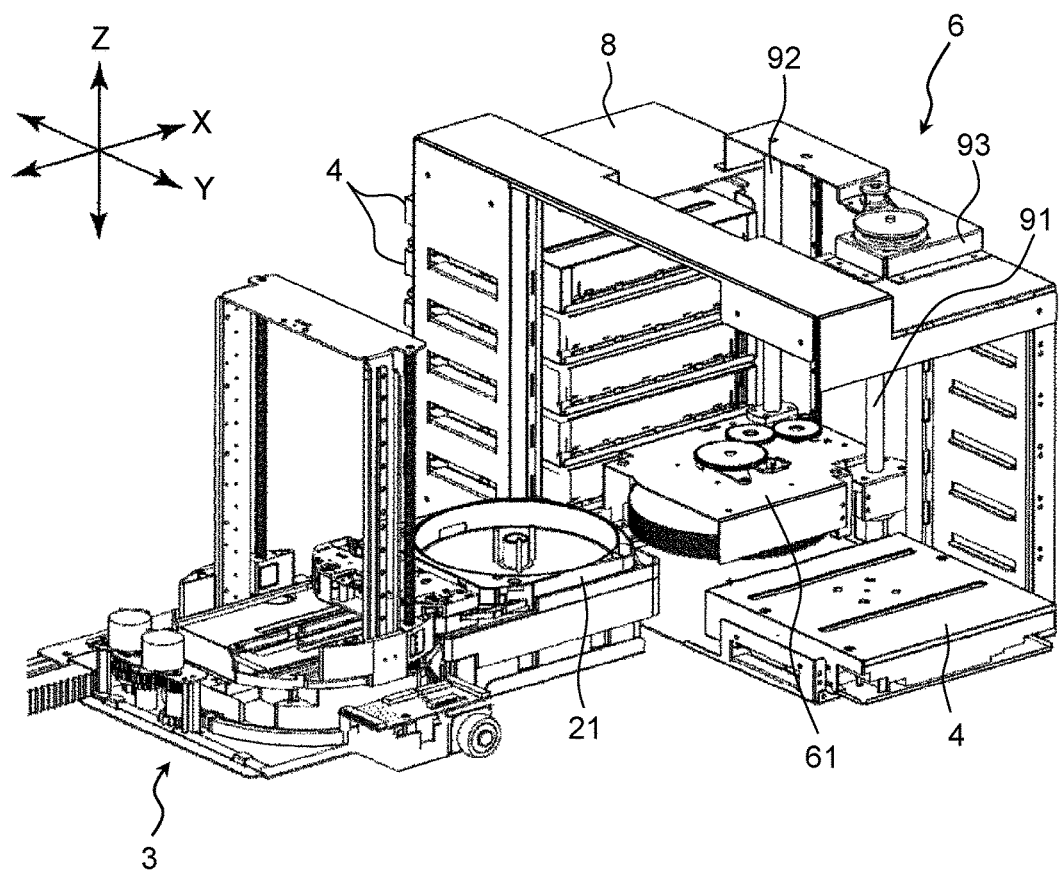
FIG. 12 is an eighth diagram describing the loading operation of a plurality of discs stored in an arbitrary magazine tray into the disc drive, and the collection operation.

Then, as shown in FIG. 12, tray 4a is carried into disc drive 4. Thereafter or at the same time, tray 4a of the other disc drive 4 facing disc drive 4 at the lowest level is ejected. Then, as in the manner described above, disc 100 is placed on tray 4a, and tray 4a is carried into disc drive 4. The operation of loading into two disc drives 4 at the lowest level is thereby completed. This loading operation is repeated for second and later levels.

Figure 13:
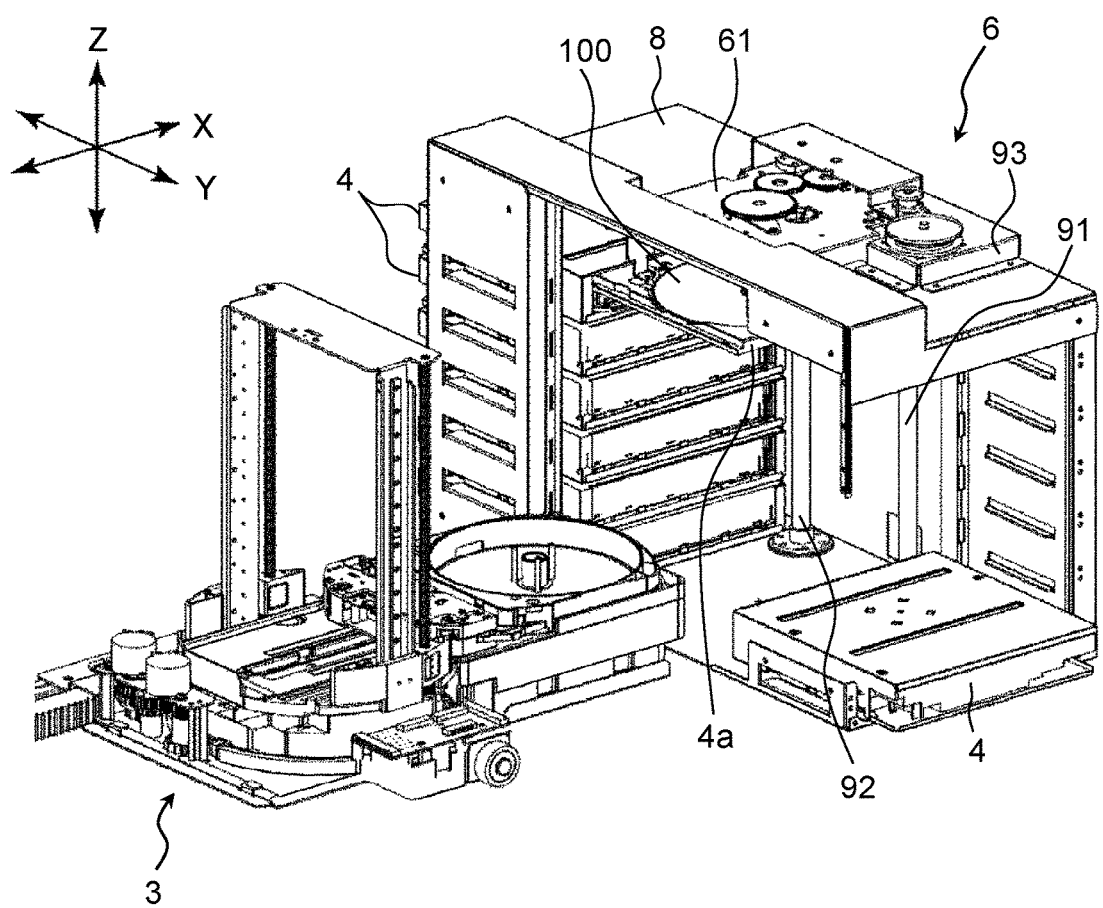
FIG. 13 is a ninth diagram describing the loading operation of a plurality of discs stored in an arbitrary magazine tray into the disc drive, and the collection operation.

FIG. 13 shows a state where disc 100 is placed on tray 4a of disc drive 4 at the highest level, for example, at the sixth level. When the loading operation for highest disc drive 4 is completed, discs 100 have been carried into all disc drives 4, and recording or reading of disc 100 carried into each disc drive 4 is enabled.

Moreover, collection of discs 100 loaded in respective disc drives 4 may be performed in the reverse order of the loading operation, for example. Specific details are given below.

First, as shown in FIG. 13, tray 4a of one of disc drives 4 at the highest level is ejected.

Then, disc chuck unit 62 is inserted in center hole 100a of disc 100 on ejected tray 4a, and disc 100 is held by disc chuck unit 62.

Then, tray 4a from which disc 100 has been collected by disc chuck unit 62 is carried into disc drive 4. Thereafter or at the same time, tray 4a of the other disc drive 4 facing disc drive 4 is ejected. Then, as in the manner described above, disc 100 on tray 4a is collected by disc chuck unit 62, and tray 4a is carried into disc drive 4. The disc collection operation for disc drives 4 at the highest level (sixth level) is thereby completed. This disc collection operation is repeated until discs 100 in disc drives 4 at the lowest level are collected.

When all discs 100 are collected by disc chuck unit 62, moving base 61 is raised. Then, picker 3 is moved to the device rear side, and magazine tray 21 is set below disc chuck unit 62.

Then, moving base 61 is lowered, the tip end portion of disc chuck unit 62 is engaged with engaging portion 23a of core rod 23, and disc chuck unit 62 and core rod 23 are made coaxial.

Figure 14:
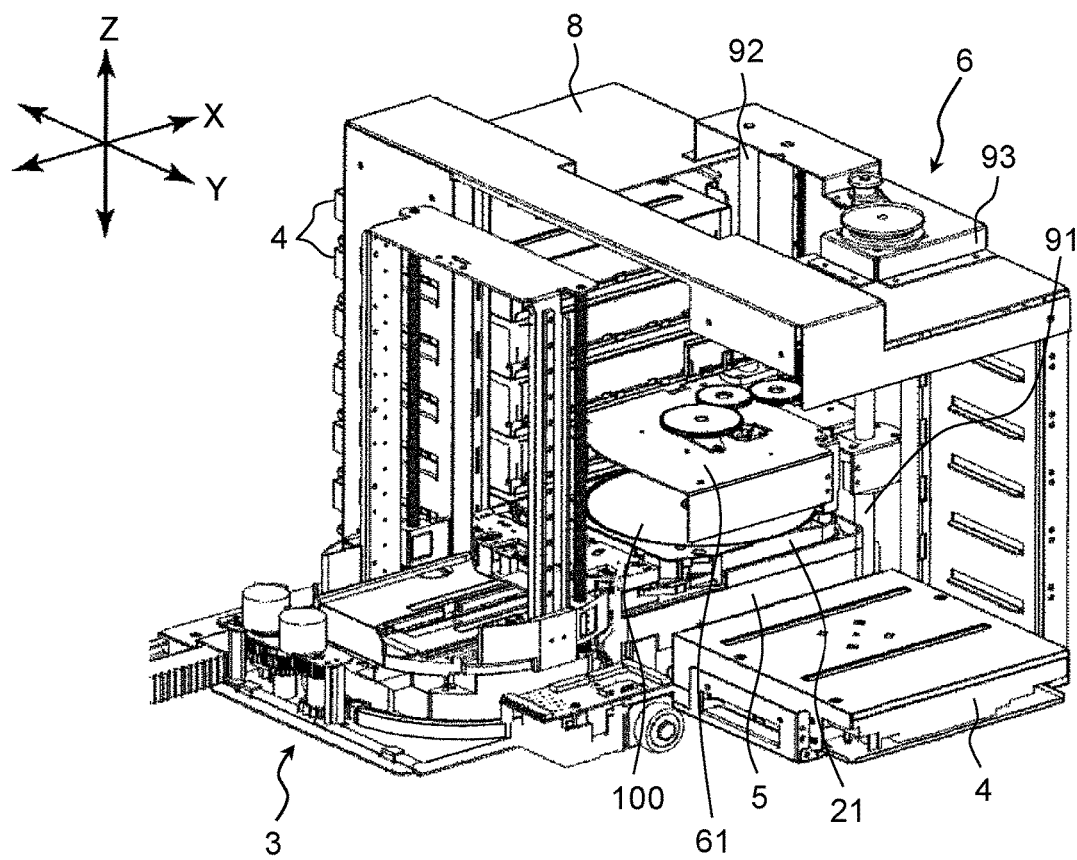
FIG. 14 is a tenth diagram describing the loading operation of a plurality of discs stored in an arbitrary magazine tray into the disc drive, and the collection operation.

Then, as shown in FIG. 14, all of a plurality of discs 100 held by disc chuck unit 62 are pushed into and stored in magazine tray 21.

Then, moving base 61 is raised, and engagement between the tip end portion of disc chuck unit 62 and engaging portion 23a of core rod 23 is released.

Magazine tray 21 storing all of the plurality of discs 100 is returned inside magazine stocker 1 by picker 3.

Next, the structure of disc chuck unit 62 will be described in greater detail.

Figure 15:
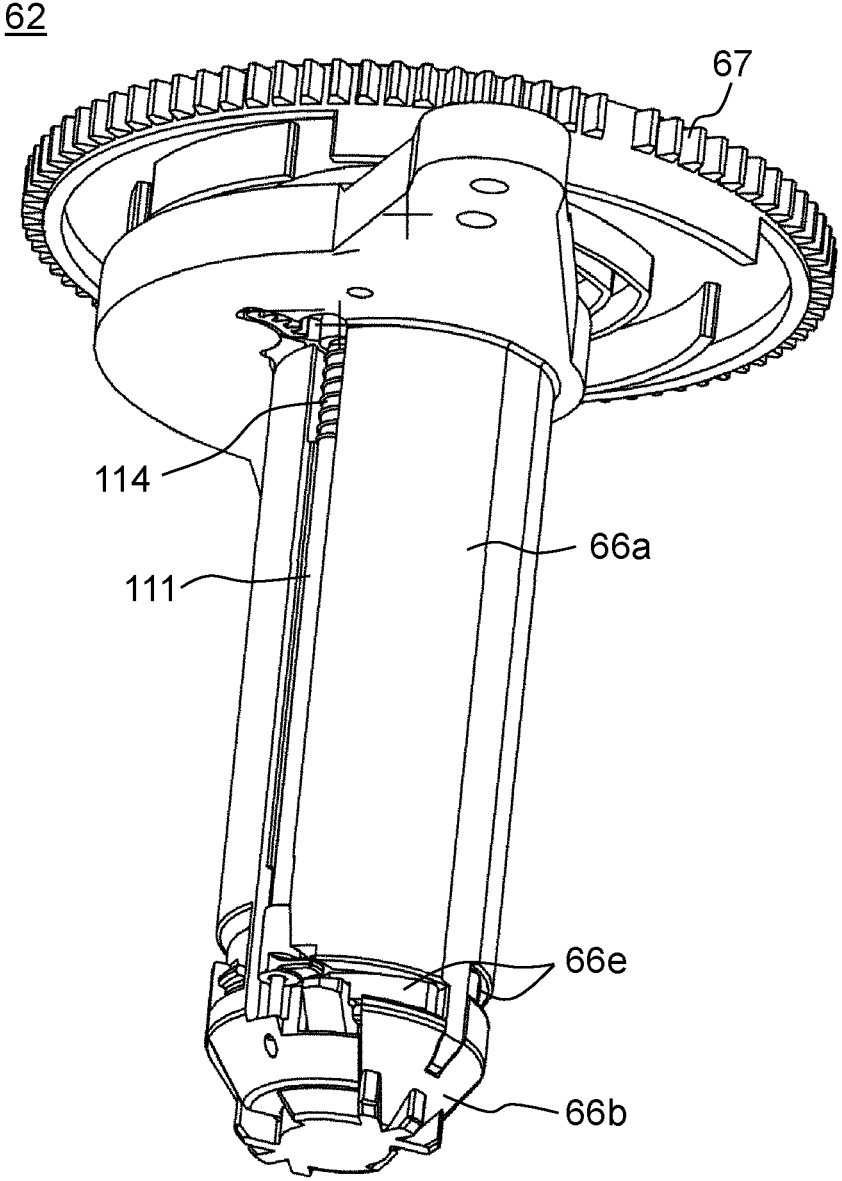
FIG. 15 is a perspective view of a disc chuck unit provided to the carrier in FIG. 4.
Figure 16:
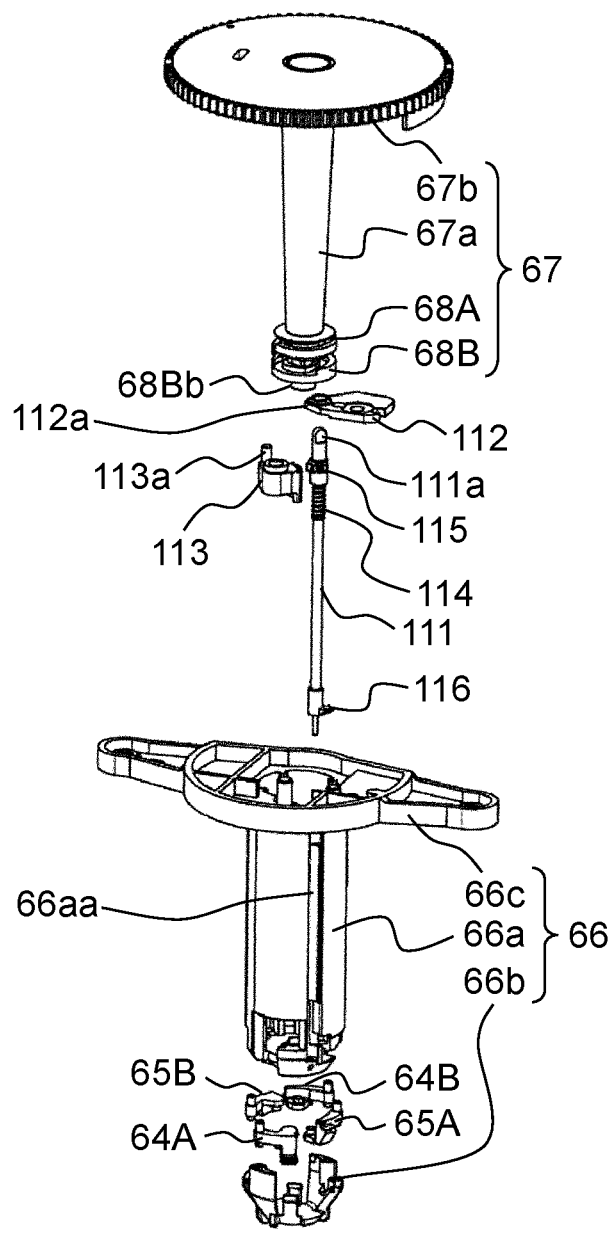
FIG. 16 is an exploded perspective view of the disc chuck unit in FIG. 15, which is seen from obliquely above.

FIG. 15 is a perspective view of disc chuck unit 62. FIG. 16 is an exploded perspective view of disc chuck unit 62 in FIG. 15, and is a diagram seen from obliquely above, and FIG. 17 is an exploded perspective view of disc chuck unit 62 in FIG. 15, and is a diagram seen from obliquely below.

Figure 17:
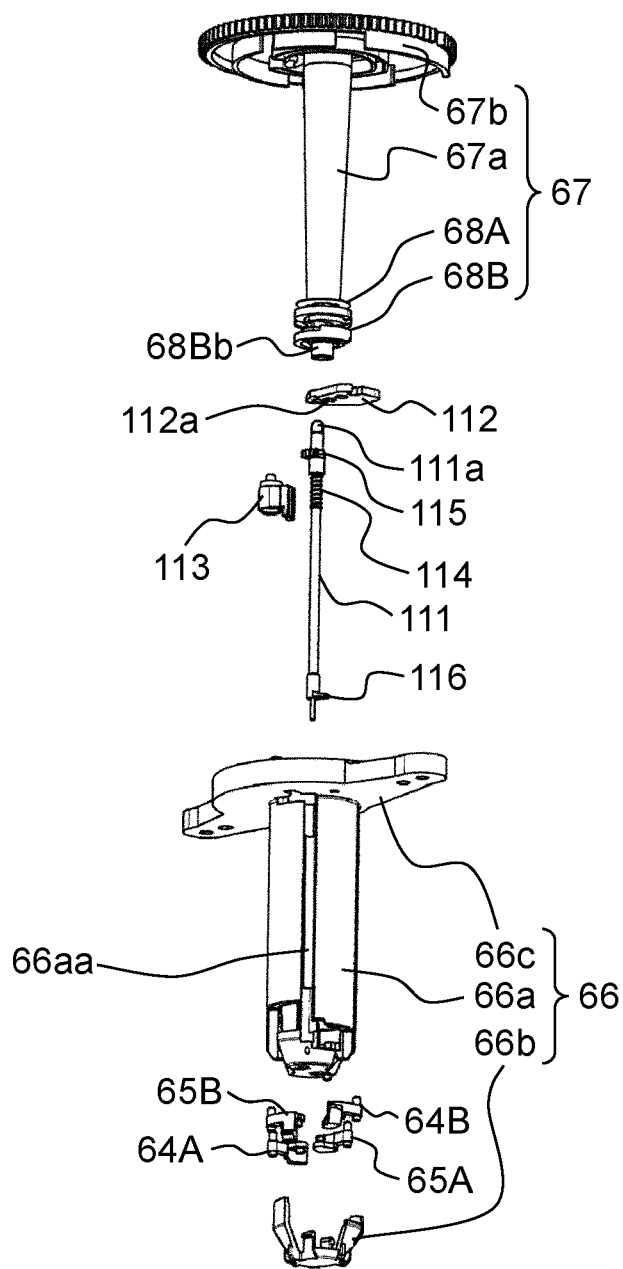
FIG. 17 is another exploded perspective view of the disc chuck unit in FIG. 15, which is seen from obliquely below.

As shown in FIGS. 16 and 17, disc chuck unit 62 includes separator hooks 64A, 64B, bottom hooks 65A, 65B, spindle unit 66, and camshaft unit 67.

Spindle unit 66 includes spindle shaft 66a having a substantially circular cylindrical shape, spindle head 66b that is provided at a lower end portion of spindle shaft 66a, and flange 66c that is provided at an upper end portion of spindle shaft 66a.

Spindle unit 66 moves integrally with moving base 61 by having flange 66c directly or indirectly attached to moving base 61. The diameter of spindle shaft 66a is set to be smaller than the diameter of center hole 100a of disc 100.

For example, the diameter of spindle shaft 66a is 14.5 mm, and the diameter of center hole 100a of disc 100 is 15 mm.

As shown in FIG. 15, a plurality of openings 66e are formed between spindle head 66b and spindle shaft 66a. Claw portions 64Ab, 64Bb of separator hooks 64A, 64B, and claw portions 65Ab, 65Bb of bottom hooks 65A, 65B, which are described later, move forward and backward, into and out of spindle shaft 66a through openings 66e.

As shown in FIGS. 16 and 17, camshaft unit 67 includes camshaft 67a having a substantially circular cylindrical shape, cam gear 67b that is provided at an upper end portion of camshaft 67a, and cam plates 68A, 68B that are provided at a lower end portion of camshaft 67a.

As described with reference to FIG. 3, cam gear 67b is meshed with relay gear 70. The driving force of disc chuck motor 71 is transferred to cam gear 67b, and cam gear 67b and camshaft 67a are thereby rotated.

A cam groove along which a drive pin provided to separator hook 64A is to slide at the time of rotation of camshaft 67a is provided on an upper surface of cam plate 68A. A cam groove along which a drive pin provided to separator hook 64B is to slide at the time of rotation of camshaft 67a is provided on a lower surface of cam plate 68A. The cam groove provided on the lower surface of cam plate 68A is mirror-symmetrical to the cam groove provided on the upper surface of cam plate 68A, and is provided at a position shifted by 180 degrees in the circumferential direction of spindle unit 66.

A cam groove along which a drive pin provided to bottom hook 65B is to slide at the time of rotation of camshaft 67a is provided on an upper surface of cam plate 68B. A cam groove along which a drive pin provided to bottom hook 65A is to slide at the time of rotation of camshaft 67a is provided on a lower surface of cam plate 68B. The cam groove provided on the lower surface of cam plate 68B is mirror-symmetrical to the cam groove provided on the upper surface of cam plate 68B, and is provided at a position shifted by 180 degrees in the circumferential direction of spindle unit 66.

Furthermore, as shown in FIGS. 16 and 17, rotation shaft 68Bb is provided at a center portion on the lower surface of cam plate 68B. Rotation shaft 68Bb is turnably inserted into a rotation shaft bearing, not shown, provided at the lower end portion of spindle shaft 66a.

Separator hooks 64A, 64B and bottom hooks 65A, 65B are formed to be substantially lever-shaped.

Furthermore, as shown in FIGS. 16 and 17, disc chuck unit 62 includes drop shaft 111, retaining plate 112, and lever gear 113.

Drop shaft 111 is attached to slit 66aa that is provided on an outer circumferential surface of spindle shaft 66a and that extends in the axial direction, for example. Coil spring 114 is attached around drop shaft 111. Coil spring 114 biases drop shaft 111 in such a way that upper end portion 111a of drop shaft 111 abuts a rear surface of cam gear 67b. Upper end portion 111a of drop shaft 111 penetrates through hole 112a provided to retaining plate 112, and abuts the rear surface of cam gear 67b. Drop shaft 111 is held by retaining plate 112 in a manner capable of moving in the axial direction.

Figure 18:
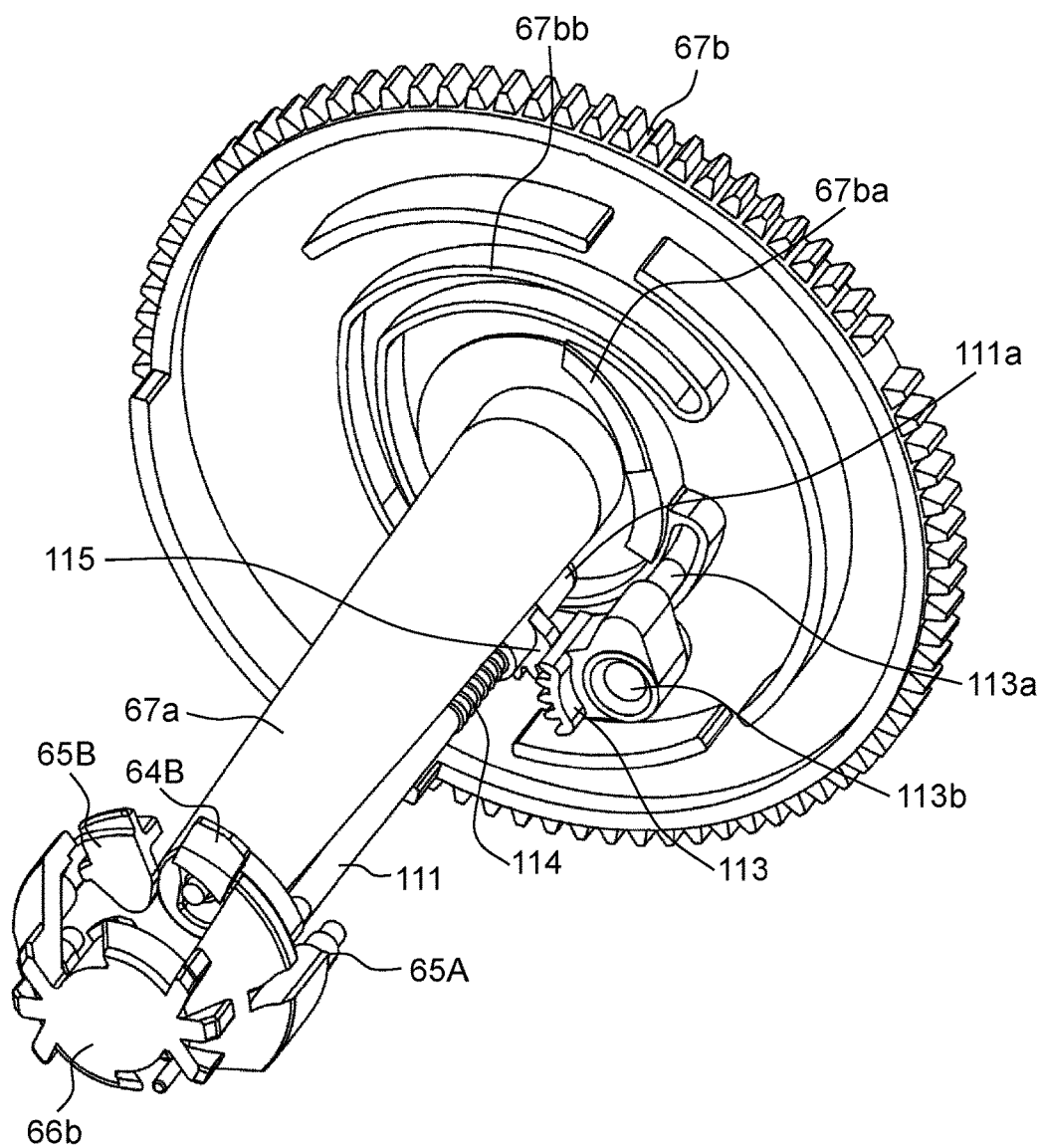
FIG. 18 is a perspective view showing the disc chuck unit in FIG. 15 by omitting some parts.

FIG. 18 is a perspective view showing disc chuck unit 62 in FIG. 15 by omitting some parts. As shown in FIG. 18, slope 67ba is provided on the rear surface of cam gear 67b. When cam gear 67b rotates, upper end portion 111a of drop shaft 111 moves up and down by moving on slope 67ba.

Furthermore, as shown in FIGS. 16 and 17, drop gear 115 that can be engaged with lever gear 113 is provided on an upper outer circumferential surface of drop shaft 111. Lever gear 113 includes drive pin 113a.

As shown in FIG. 18, drive pin 113a engages with cam groove 67bb that is provided on the rear surface of cam gear 67b. When cam gear 67b rotates, drive pin 113a slides inside cam groove 67bb. When drive pin 113a reaches an end portion of cam groove 67bb by rotation of cam gear 67b, lever gear 113 is rotated around drive pin 113a.

Figure 19:
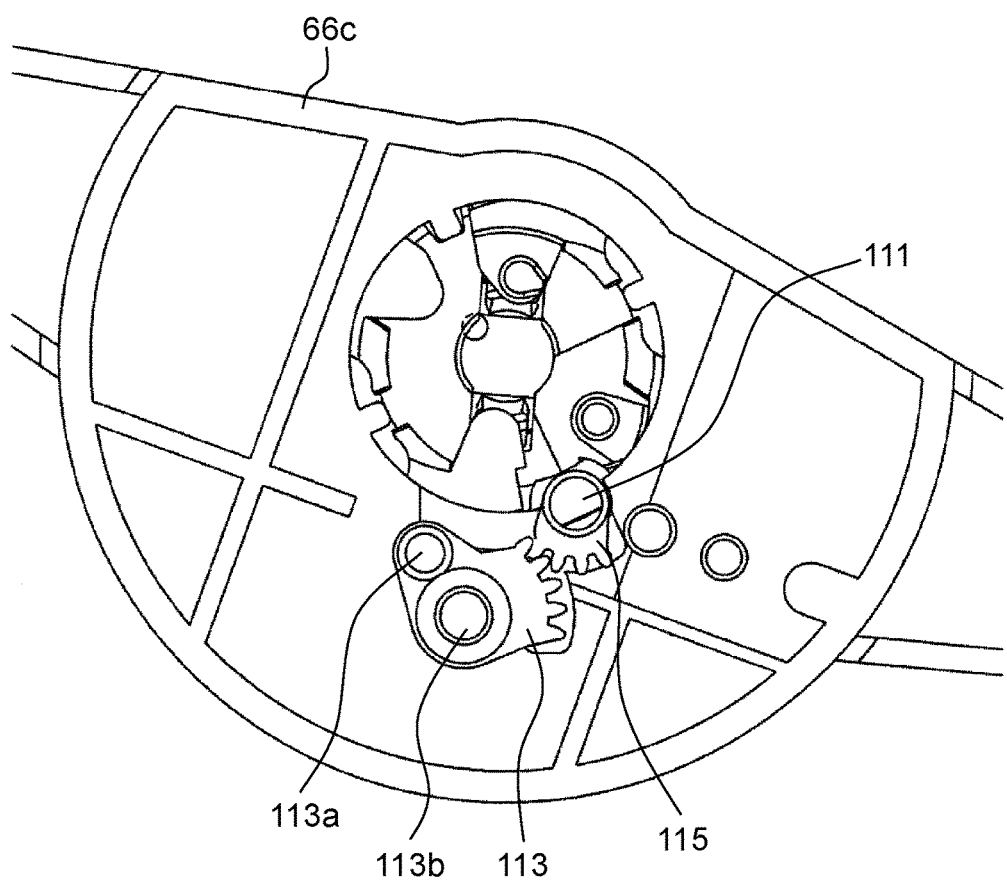
FIG. 19 is a plan view showing a state where a lever gear and a drop gear provided to the disc chuck unit in FIG. 15 are engaged with each other.
Figure 20:
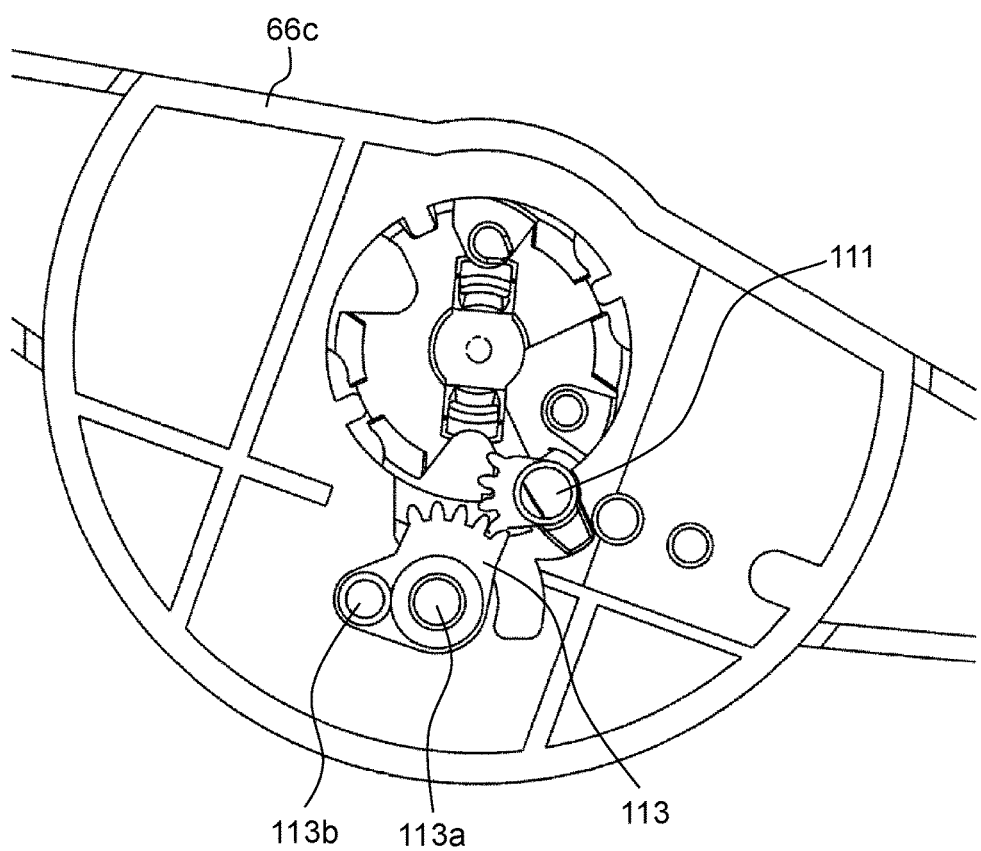
FIG. 20 is a plan view showing a state where the lever gear and the drop gear are rotated from the state in FIG. 19.

FIG. 19 is a plan view showing a state where lever gear 113 and drop gear 115 provided to disc chuck unit 62 in FIG. 15 are engaged with each other, and FIG. 20 is a plan view showing a state where lever gear 113 and drop gear 115 are rotated from the state in FIG. 19. As shown in FIGS. 19 and 20, drop gear 115 is rotated by lever gear 113 rotating in a state where drop gear 115 and lever gear 113 are engaged with each other. Drop shaft 111 is thereby rotated.

As shown in FIGS. 16 and 17, separation claw 116 is provided at a lower end portion of drop shaft 111. Separation claw 116 moves forward and backward, into and out of spindle shaft 66a by the rotation of drop shaft 111. Also, separation claw 116 moves up and down by upper end portion 111a of drop shaft 111 moving on slope 67ba.

Figure 21:
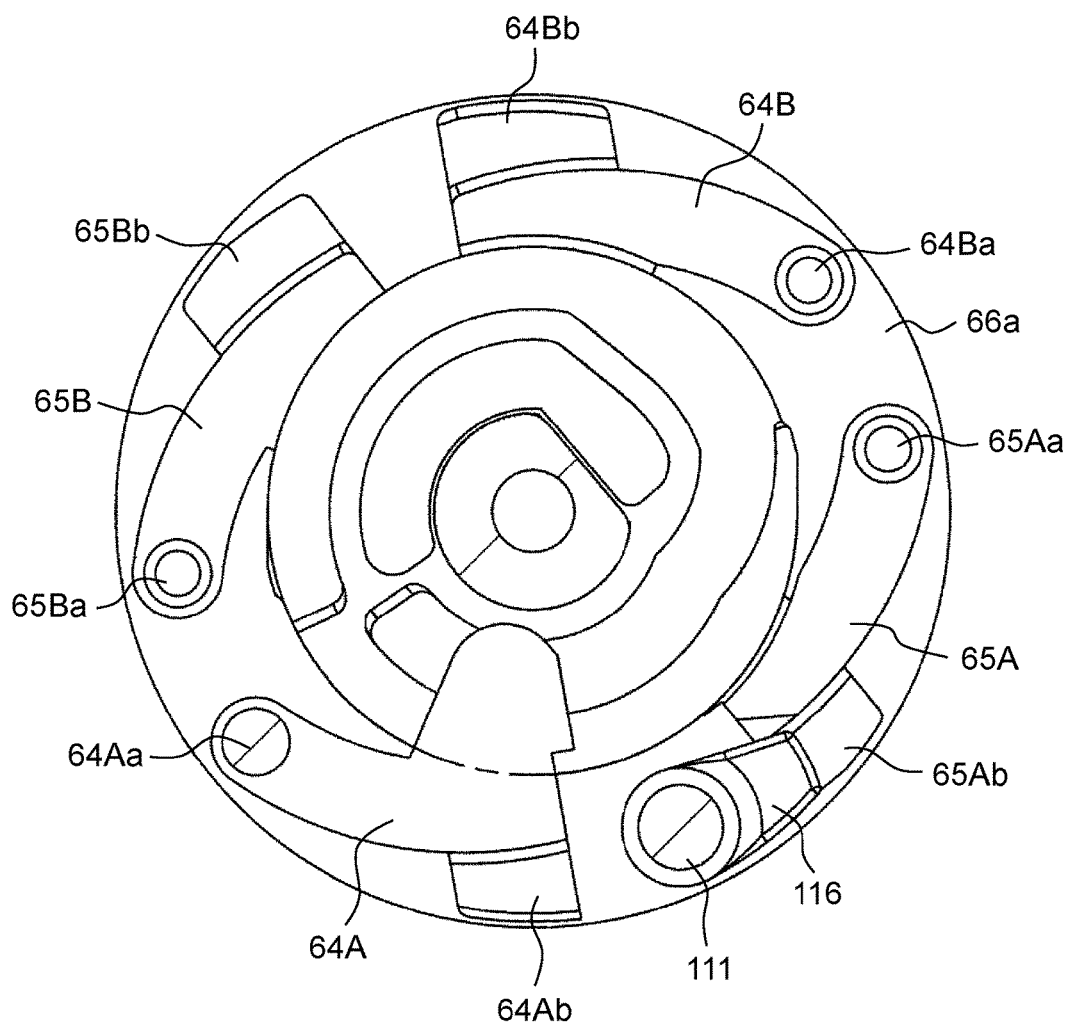
FIG. 21 is a diagram focusing on the positional relationship among a spindle shaft, claw portions of two separator hooks, claw portions of two bottom hooks, and a separation claw, which are provided to the disc chuck unit in FIG. 15, the diagram showing a state where the four claw portions are positioned at a storage position.

FIG. 21 is a diagram focusing on the positional relationship among spindle shaft 66a, claw portions 64Ab, 64Bb of two separator hooks 64A, 64B, claw portions 65Ab, 65Bb of two bottom hooks 65A, 65B, and separation claw 116, which are provided to disc chuck unit 62 in FIG. 15. As shown in FIG. 21, separator hooks 64A, 64B and bottom hooks 65A, 65B include rotation shafts 64Aa, 64Ba, 65Aa, 65Ba and drive pins, not shown, extending in the device height direction, and claw portions 64Ab, 64Bb, 65Ab, 65Bb protruding in a direction intersecting the device height direction, such as an orthogonal direction.

Separator hooks 64A, 64B and bottom hooks 65A, 65B are rotatably held by having rotation shafts 64Aa, 64Ba, 65Aa, 65Ba inserted in rotation shaft holes, not shown, provided to each of spindle head 66b and spindle shaft 66a. Also, separator hooks 64A, 64B and bottom hooks 65A, 65B are held in such a way that upper surfaces of claw portions 64Ab, 64Bb of separator hooks 64A, 64B are positioned above upper surfaces of claw portions 65Ab, 65Bb of bottom hooks 65A, 65B by a thickness of substantially one disc. Moreover, separator hook 64A and separator hook 64B are held at positions shifted from each other by substantially 180 degrees in the circumferential direction of spindle unit 66, and bottom hook 65A and bottom hook 65B are held at positions shifted from each other by substantially 180 degrees in the circumferential direction of spindle unit 66.

When upper end portion 111a of drop shaft 111 is not moving on slope 67ba and a top surface of slope 67ba, separation claw 116 is positioned at substantially the same height as claw portions 64Ab, 64Bb of separator hooks 64A, 64B.

In the present exemplary embodiment, claw portions 64Ab, 64Bb of separator hooks 64A, 64B form a second support claw that is capable of supporting an inner circumferential portion of disc 100. Also, claw portions 65Ab, 65Bb of bottom hooks 65A, 65B form a first support claw that is capable of supporting the inner circumferential portion of disc 100.

Next, a rotation operation of separator hooks 64A, 64B and bottom hooks 65A, 65B will be described in detail with reference to FIGS. 21 to 24.

Figure 22:
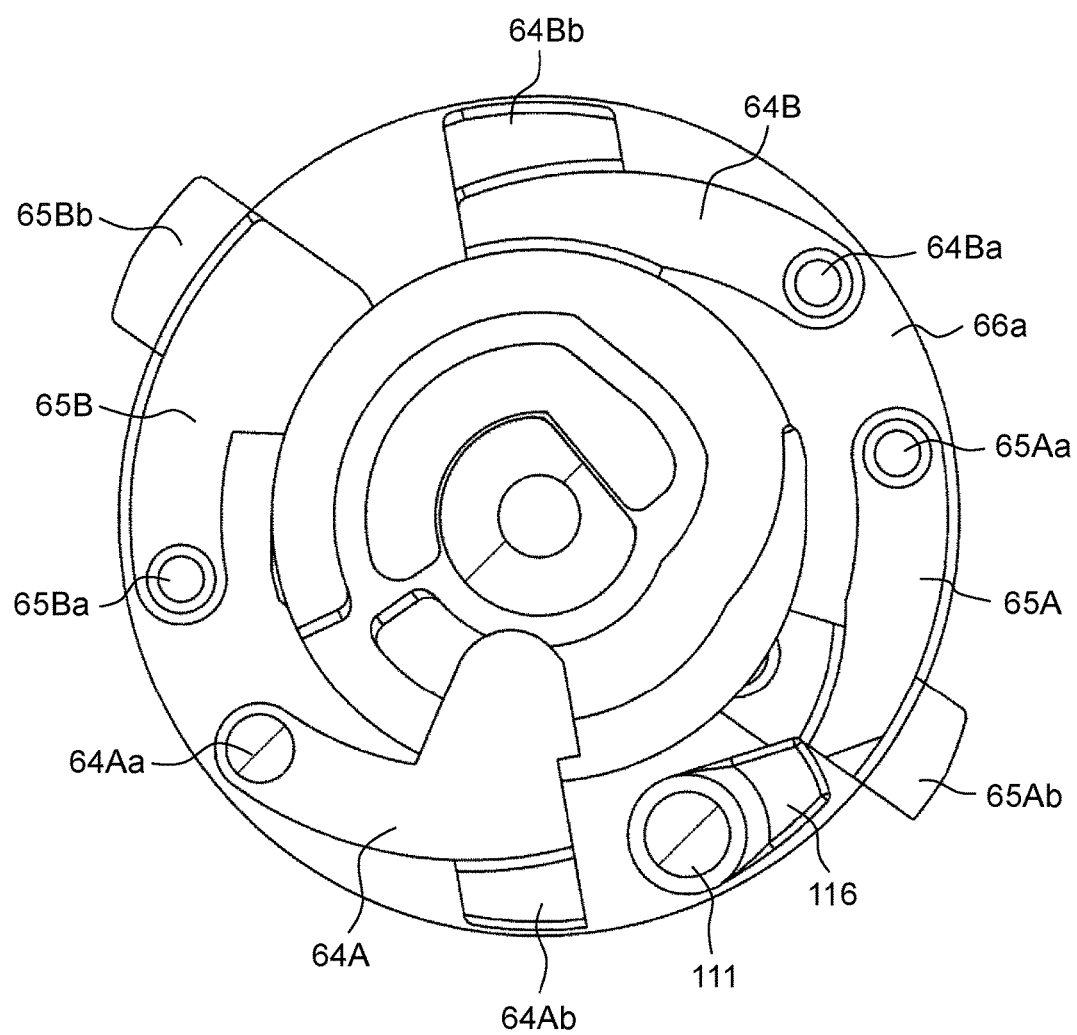
FIG. 22 is a diagram focusing on the positional relationship among the spindle shaft, the claw portions of the two separator hooks, the claw portions of the two bottom hooks, and the separation claw, which are provided to the disc chuck unit in FIG. 15, the diagram showing a state where the four claw portions are positioned at a supporting position.
Figure 23:
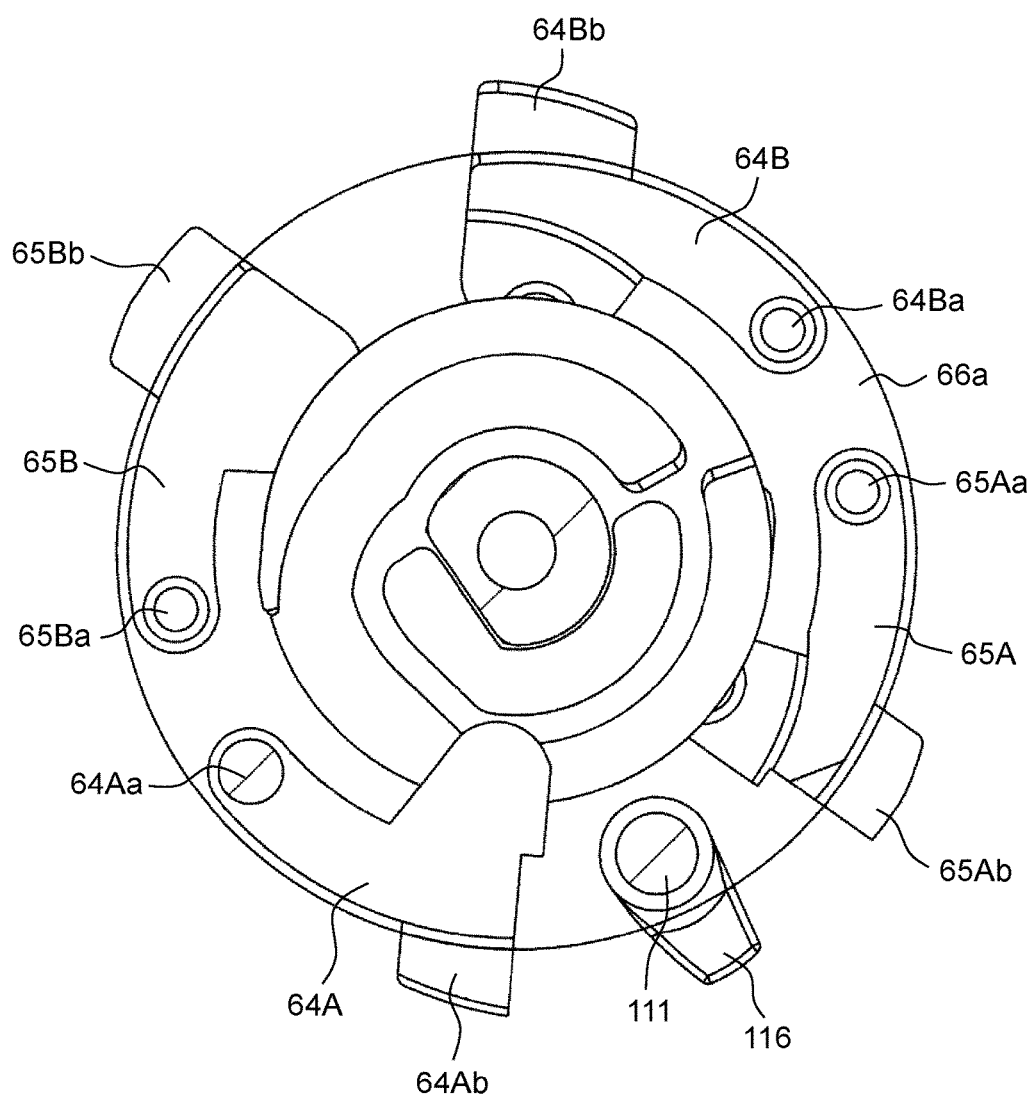
FIG. 23 is a diagram focusing on the positional relationship among the spindle shaft, the claw portions of the two separator hooks, the claw portions of the two bottom hooks, and the separation claw, which are provided to the disc chuck unit in FIG. 15, the diagram showing a state where the four claw portions are positioned at a switching position.
Figure 24:
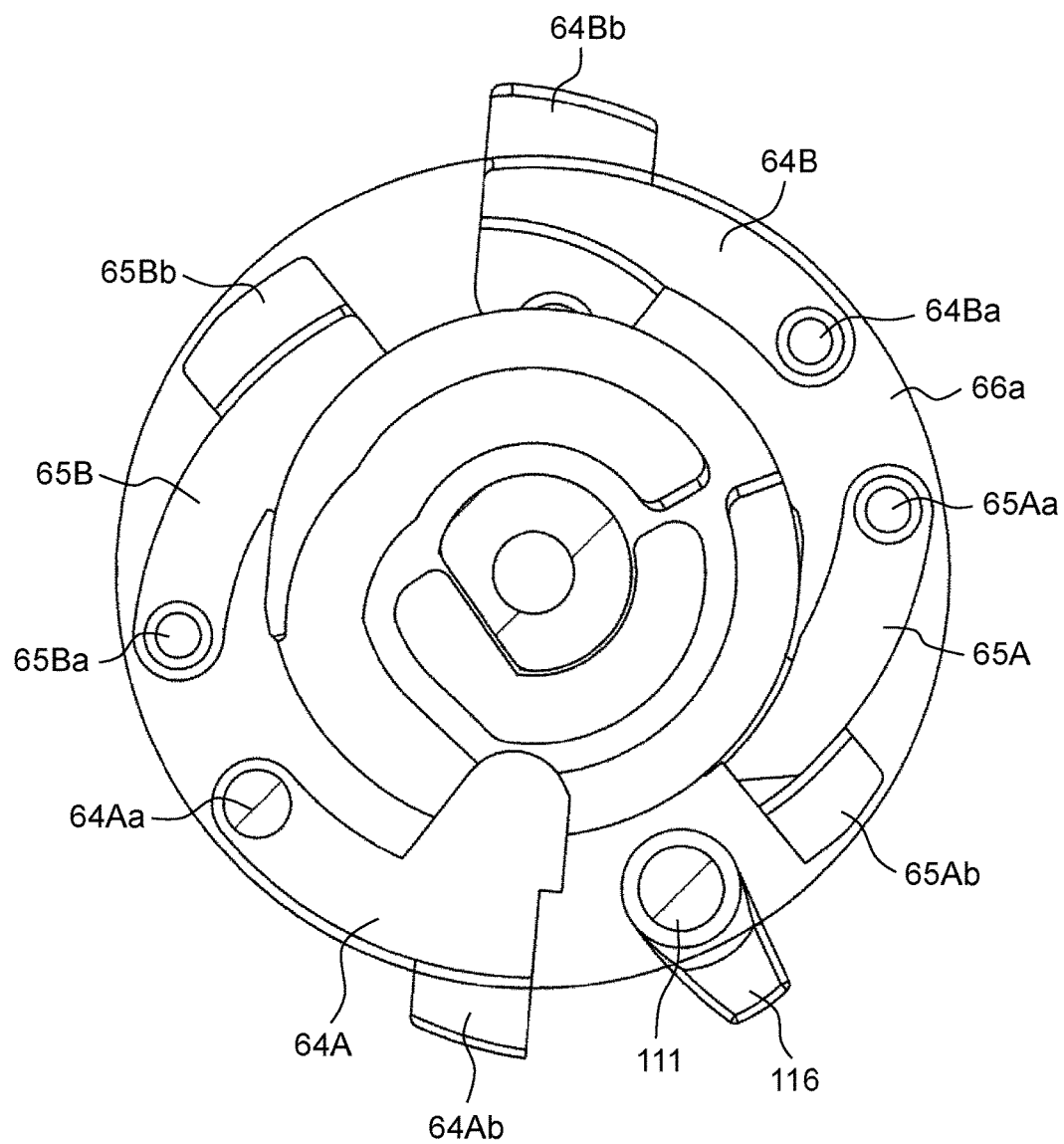
FIG. 24 is a diagram focusing on the positional relationship among the spindle shaft, the claw portions of the two separator hooks, the claw portions of the two bottom hooks, and the separation claw, which are provided to the disc chuck unit in FIG. 15, the diagram showing a state where the four claw portions are positioned at a separation position.

When cam gear 67b is rotated, claw portions 64Ab, 64Bb of separator hook 64A and separator hook 64B are moved to positions inside spindle shaft 66a as shown in FIGS. 21 and 22, or to positions outside spindle shaft 66a as shown in FIGS. 23 and 24.

When cam gear 67b is rotated, claw portions 65Ab, 65Bb of bottom hook 65A and bottom hook 65B are moved to positions inside spindle shaft 66a as shown in FIGS. 21 and 24, or to positions outside spindle shaft 66a as shown in FIGS. 22 and 23.

The position as shown in FIG. 21 where separator hooks 64A, 64B and bottom hooks 65A, 65B are positioned inside spindle shaft 66a is referred to as a storage position. Also, the position as shown in FIG. 22 where separator hooks 64A, 64B are positioned inside spindle shaft 66a, and bottom hooks 65A, 65B are positioned outside spindle shaft 66a is referred to as a supporting position. Also, the position as shown in FIG. 23 where separator hooks 64A, 64B and bottom hooks 65A, 65B are positioned outside spindle shaft 66a is referred to as a switching position. Furthermore, the position as shown in FIG. 24 where separator hooks 64A, 64B are positioned outside spindle shaft 66a, and bottom hooks 65A, 65B are positioned inside spindle shaft 66a is referred to as a separation position.

When cam gear 67b is rotated, separation claw 116 is moved to a position inside spindle shaft 66a as shown in FIGS. 21 and 22, or to a position outside spindle shaft 66a as shown in FIGS. 23 and 24. When separator hooks 64A, 64B and bottom hooks 65A, 65B are at the storage position or the supporting position, separation claw 116 is at a position inside spindle shaft 66a. On the other hand, when separator hooks 64A, 64B and bottom hooks 65A, 65B are at the switching position or the separation position, separation claw 116 is at a position outside spindle shaft 66a. Additionally, a stopper, not shown, is provided to separator hooks 64A, 64B, bottom hooks 65A, 65B, and separation claw 116 so as to restrict the rotation range.

Next, an operation of carrier 6 separating one disc from a plurality of discs, and placing the separated disc on tray 4a of disc drive 4 will be described.

Figure 25:
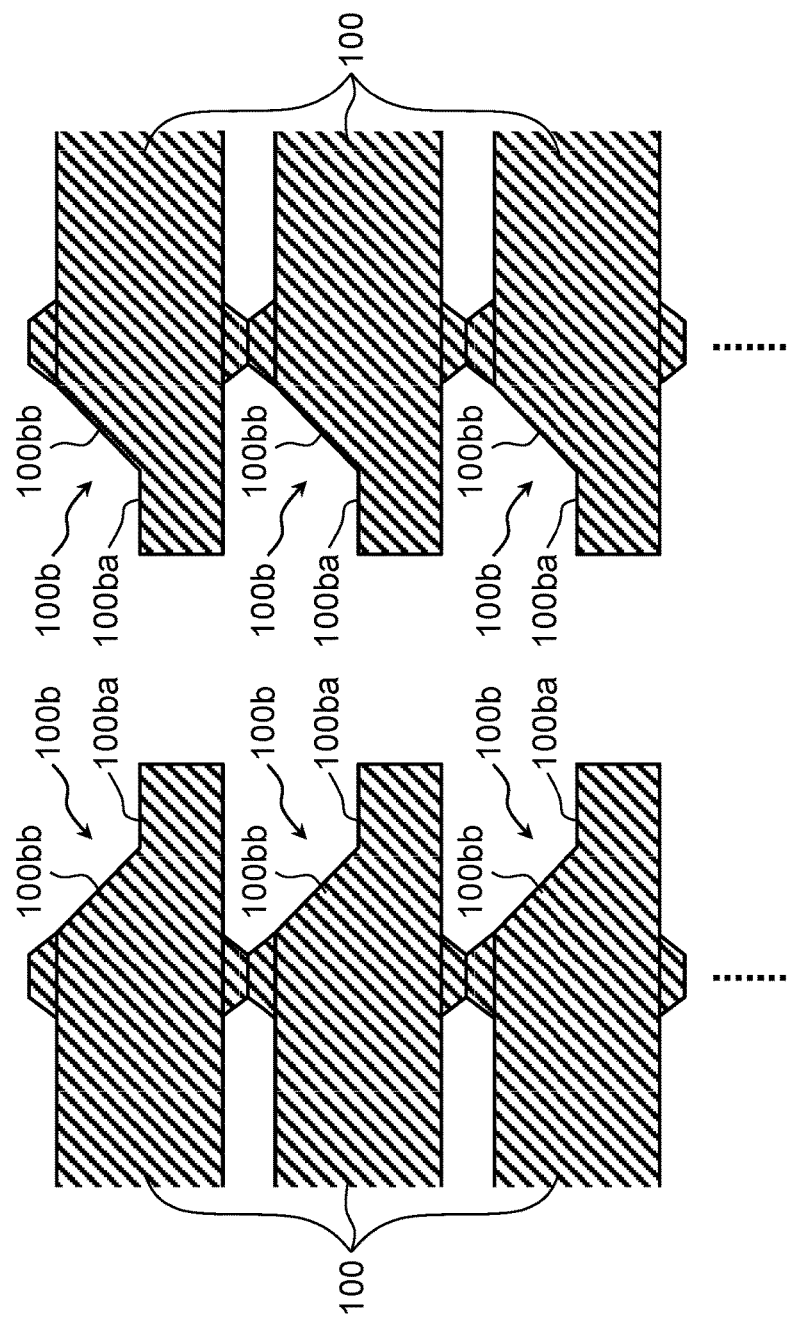
FIG. 25 is a cross-sectional view of a plurality of discs 100 in FIG. 2B along the line 19-19.

FIG. 25 is a cross-sectional view of a plurality of discs 100 in FIG. 2B along the line 19-19. As shown in FIG. 25, recessed portion 100b is provided on an inner circumferential portion of disc 100. Recessed portion 100b is formed to have a shape that is obtained by cutting an upper corner portion of the inner circumferential portion of disc 100 so as to have flat surface 100ba and inclined surface 100bb.

FIGS. 26 to 35 schematically show separation of one disc from a plurality of discs 100 by carrier 6 in FIG. 3. Additionally, in FIGS. 26 to 28, for the sake of convenience, claw portions 64Ab, 64Bb of separator hooks 64A, 64B, and claw portions 65Ab, 65Bb of bottom hooks 65A, 65B are shown to be on the same cross section. Also, in FIGS. 29 to 35, for the sake of convenience, claw portion 64Ab of separator hook 64A and claw portion 65Ab of bottom hook 65A are shown to be on the same cross section.

Figure 26:
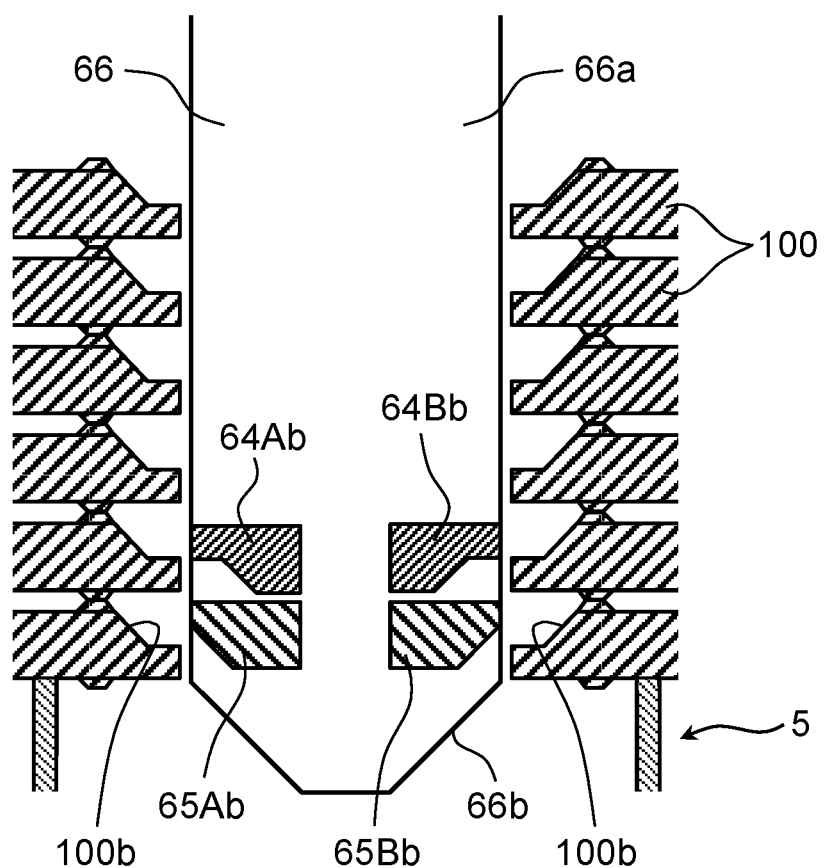
FIG. 26 is a first diagram schematically showing one disc being separated from a plurality of discs by the carrier in FIG. 3.

As shown in FIG. 26, lower surfaces of claw portions 64Ab, 64Bb of separator hooks 64A, 64B are formed to be inclined such that the thickness is increased in the downward direction from the outer circumferential side to the inner circumferential side. Also, upper surfaces of claw portions 64Ab, 64Bb, 65Ab, 65Bb are formed to be orthogonal to the device height direction.

The operation will be described from a state where a plurality of discs 100 are pushed out from magazine tray 21 by lifter 5.

As shown in FIG. 26, when lifter 5 pushes out a plurality of discs 100, spindle unit 66 is inserted into center holes 100a of the plurality of discs 100. At this time, separator hooks 64A, 64B and bottom hooks 65A, 65B are at the storage position.

Figure 27:
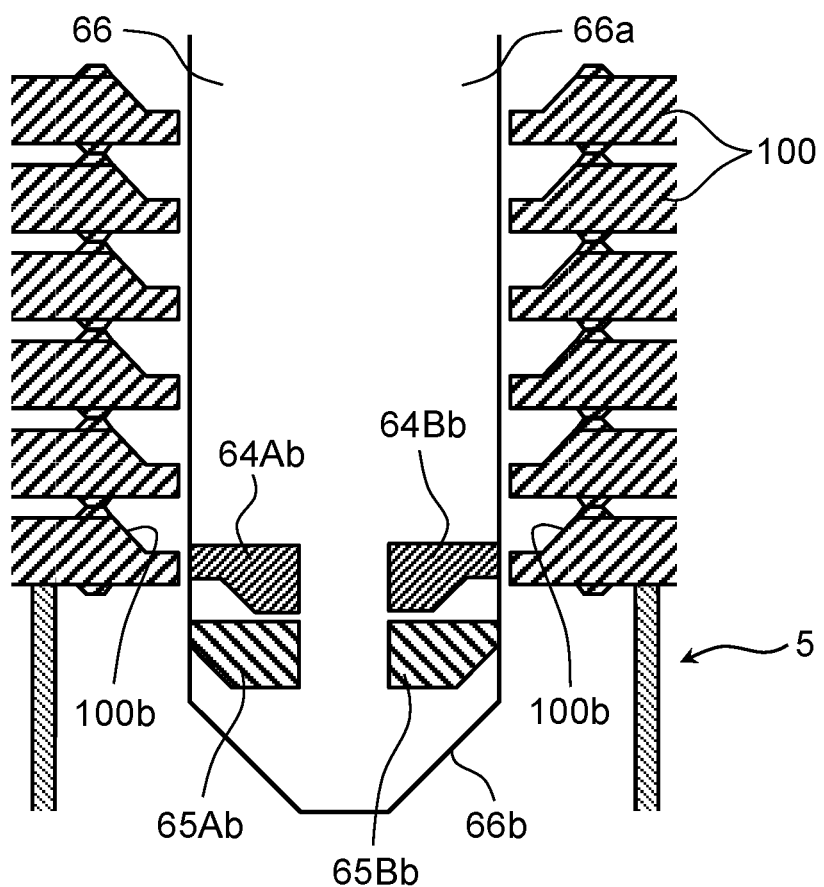
FIG. 27 is a second diagram schematically showing the one disc being separated from a plurality of discs by the carrier in FIG. 3.

As shown in FIG. 27, when the plurality of discs 100 are pushed out by lifter 5 until claw portions 65Ab, 65Bb of bottom hooks 65A, 65B are positioned below the bottom disc of the plurality of discs, disc chuck motor 71 described with reference to FIG. 4 is driven, and cam gear 67b is rotated around the axis in the forward direction.

Figure 28:
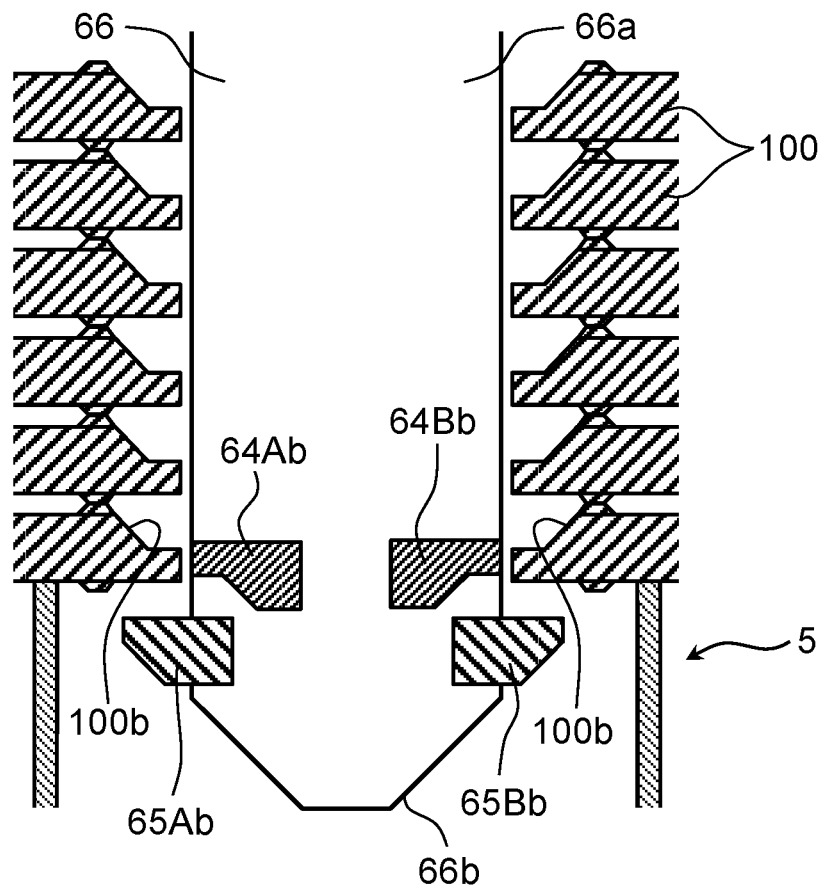
FIG. 28 is a third diagram schematically showing the one disc being separated from a plurality of discs by the carrier in FIG. 3.

Accordingly, separator hooks 64A, 64B and bottom hooks 65A, 65B are moved from the storage position to the supporting position as shown in FIG. 28.

Figure 29:
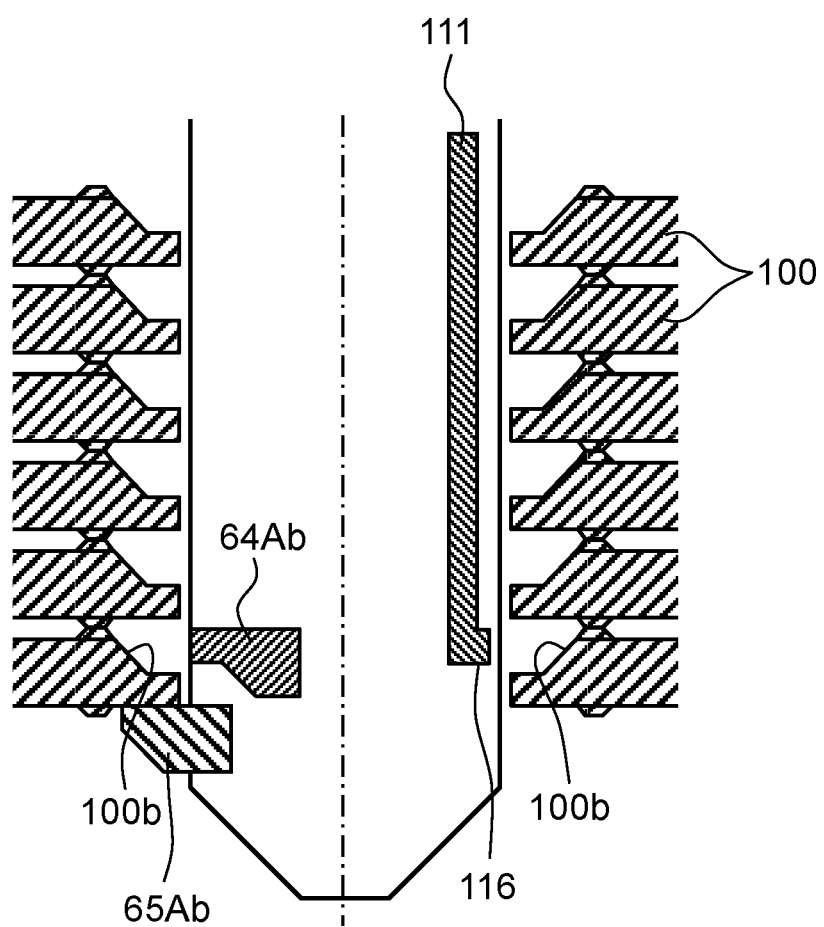
FIG. 29 is a fourth diagram schematically showing the one disc being separated from a plurality of discs by the carrier in FIG. 3.

Then, as shown in FIG. 29, moving base 61 is raised, and the upper surfaces of claw portions 65Ab, 65Bb of bottom hooks 65A, 65B come into contact with the inner circumferential portion of bottom disc 100 to support all of discs 100. Also, at this time, engagement between spindle head 66b and engaging portion 23a of core rod 23 is released.

Figure 30:
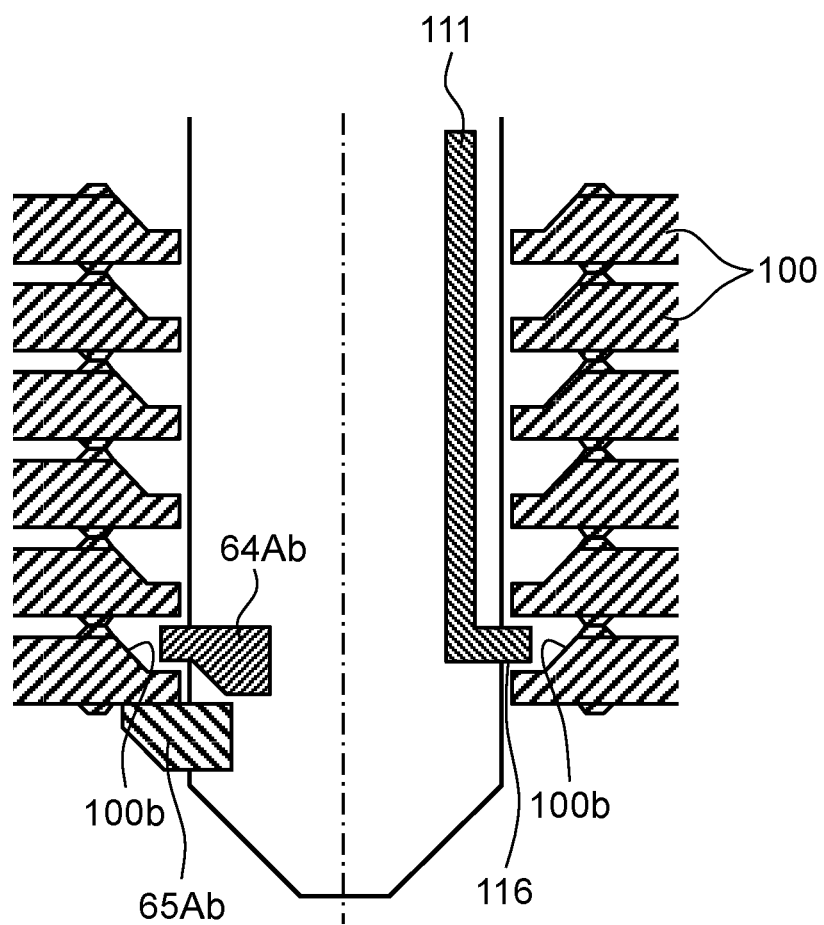
FIG. 30 is a fifth diagram schematically showing the one disc being separated from a plurality of discs by the carrier in FIG. 3.

Then, disc chuck motor 71 is further driven, and cam gear 67b is further rotated in the forward direction. Separator hooks 64A, 64B and bottom hooks 65A, 65B are thereby moved from the supporting position to the switching position, and as shown in FIG. 30, claw portions 64Ab, 64Bb of separator hooks 64A, 64B are inserted into recessed portion 100b of bottom disc 100. Also, at this time, due to rotation of cam gear 67b in the forward direction, drop shaft 111 is rotated in the forward direction, and separation claw 116 is inserted into recessed portion 100b of bottom disc 100.

Then, as described with reference to FIG. 8, picker 3 is moved to the device front side, and magazine tray 21 is retracted from near disc drive 4. Then, as described with reference to FIG. 9, tray 4a of disc drive 4 is ejected.

Figure 31:
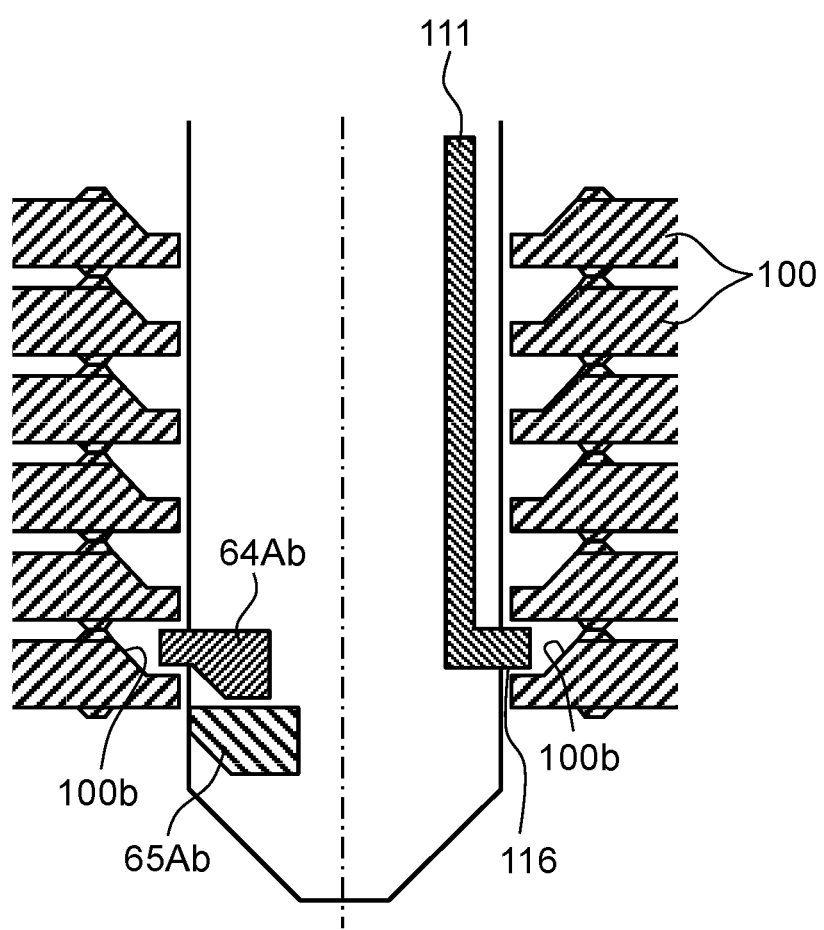
FIG. 31 is a sixth diagram schematically showing the one disc being separated from a plurality of discs by the carrier in FIG. 3.

Then, moving base 61 is lowered such that the plurality of discs 100 held by spindle unit 66 are positioned above, for example, immediately above, tray 4a. Disc chuck motor 71 is further driven in this state, and cam gear 67b is further rotated in the forward direction. Separator hooks 64A, 64B and bottom hooks 65A, 65B are thereby moved from the switching position to the separation position, and as shown in FIG. 31, claw portions 65Ab, 65Bb of bottom hooks 65A, 65B are moved to positions inside spindle shaft 66a. Accordingly, the plurality of discs 100 which were supported by claw portions 65Ab, 65Bb of bottom hooks 65A, 65B are caused to fall of their own weight. As a result, the upper surfaces of claw portions 64Ab, 64Bb of separator hooks 64A, 64B come into contact with the inner circumferential portion of disc 100 that is adjacent to bottom disc 100 to support discs 100 positioned above bottom disc 100.

Figure 32:
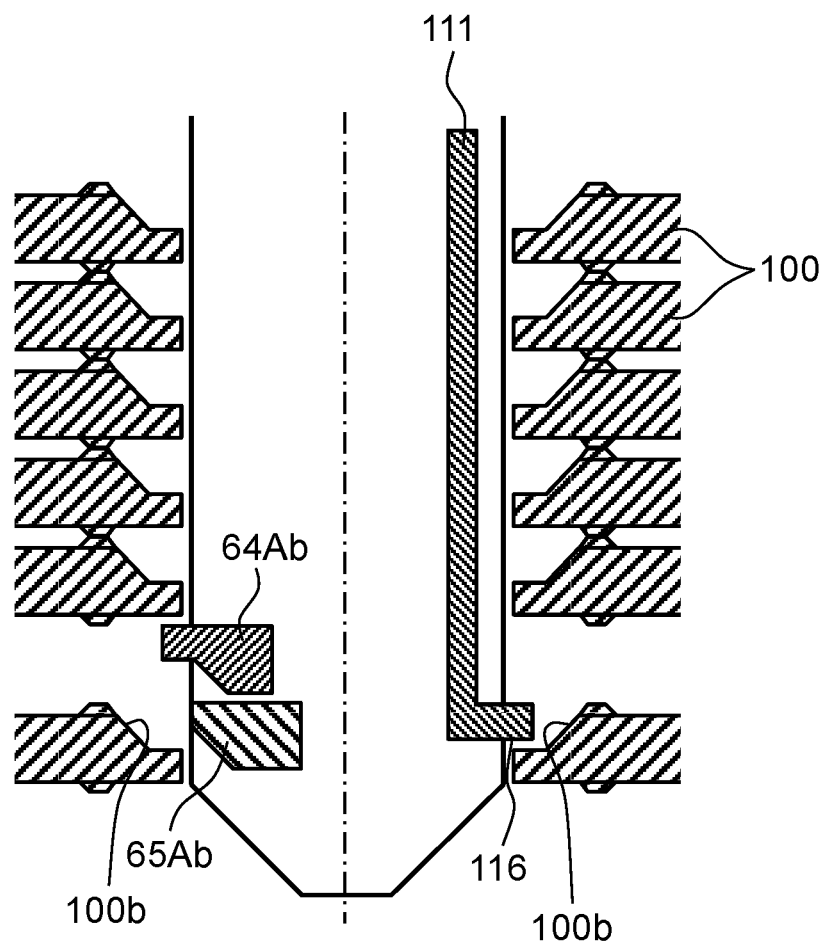
FIG. 32 is a seventh diagram schematically showing the one disc being separated from a plurality of discs by the carrier in FIG. 3.

Then, disc chuck motor 71 is further driven, and cam gear 67b is further rotated in the forward direction. Upper end portion 111a of drop shaft 111 thereby moves on slope 67ba, and separation claw 116 is lowered. As a result, as shown in FIG. 32, bottom disc 100 is pushed downward by separation claw 116 and is separated from other discs 100. Bottom disc 100 which is separated falls and is placed on tray 4a.

Additionally, separation claw 116 may be lowered to below the upper surfaces of claw portions 65Ab, 65Bb of bottom hooks 65A, 65B, such as by 2.4 mm or more. This allows bottom disc 100 to be more reliably separated from other discs 100.

When bottom disc 100 is placed on tray 4a, moving base 61 is raised so that spindle unit 66 and tray 4a do not come into contact with each other. Then, tray 4a is carried into disc drive 4. Thereafter or at the same time, tray 4a of disc drive 4 facing disc drive 4 is ejected.

Figure 33:
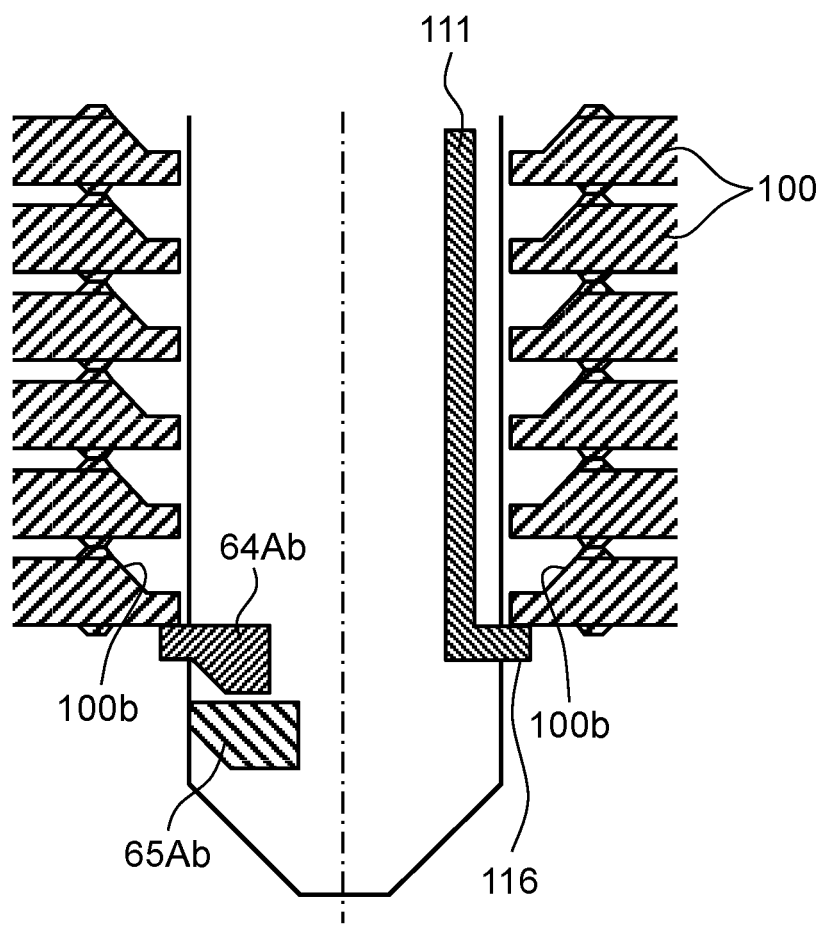
FIG. 33 is an eighth diagram schematically showing the one disc being separated from a plurality of discs by the carrier in FIG. 3.

Then, disc chuck motor 71 is reversely driven, and cam gear 67b is rotated in the reverse direction. Upper end portion 111a of drop shaft 111 thereby moves on slope 67ba, and as shown in FIG. 33, separation claw 116 is raised to substantially the same height as claw portions 64Ab, 64Bb of separator hooks 64A, 64B.

Figure 34:
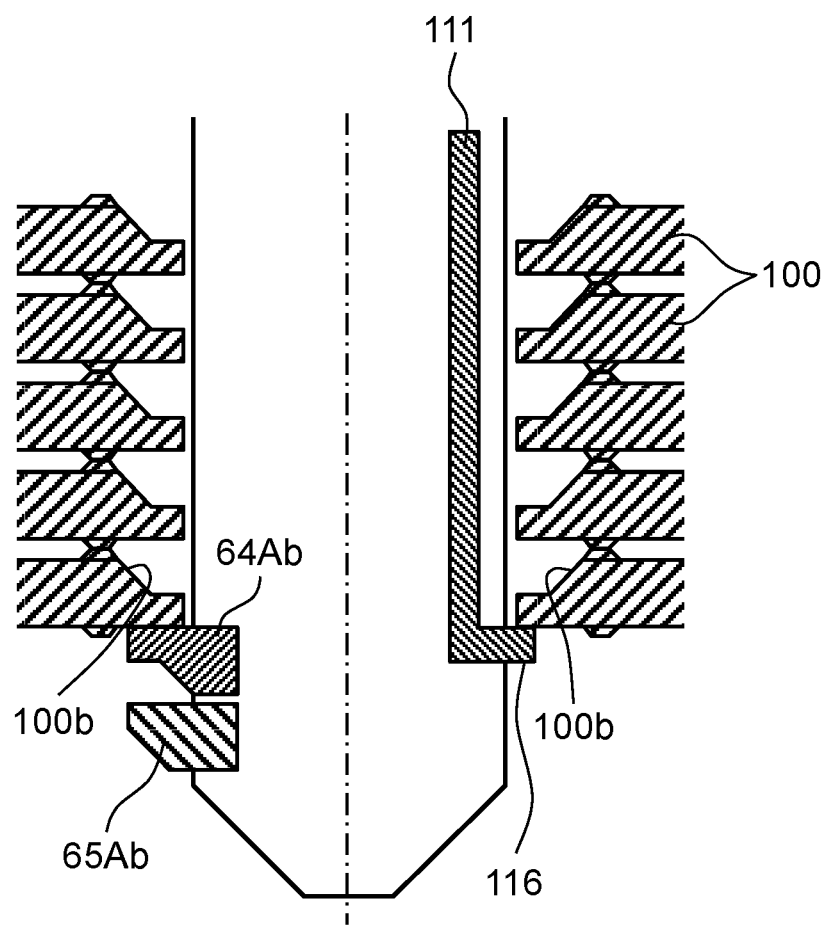
FIG. 34 is a ninth diagram schematically showing the one disc being separated from a plurality of discs by the carrier in FIG. 3.

Then, disc chuck motor 71 is further reversely driven, and cam gear 67b is further rotated in the reverse direction. Separator hooks 64A, 64B and bottom hooks 65A, 65B thereby move from the separation position to the switching position, and as shown in FIG. 34, claw portions 65Ab, 65Bb of bottom hooks 65A, 65B are moved to positions outside spindle shaft 66a.

Figure 35:
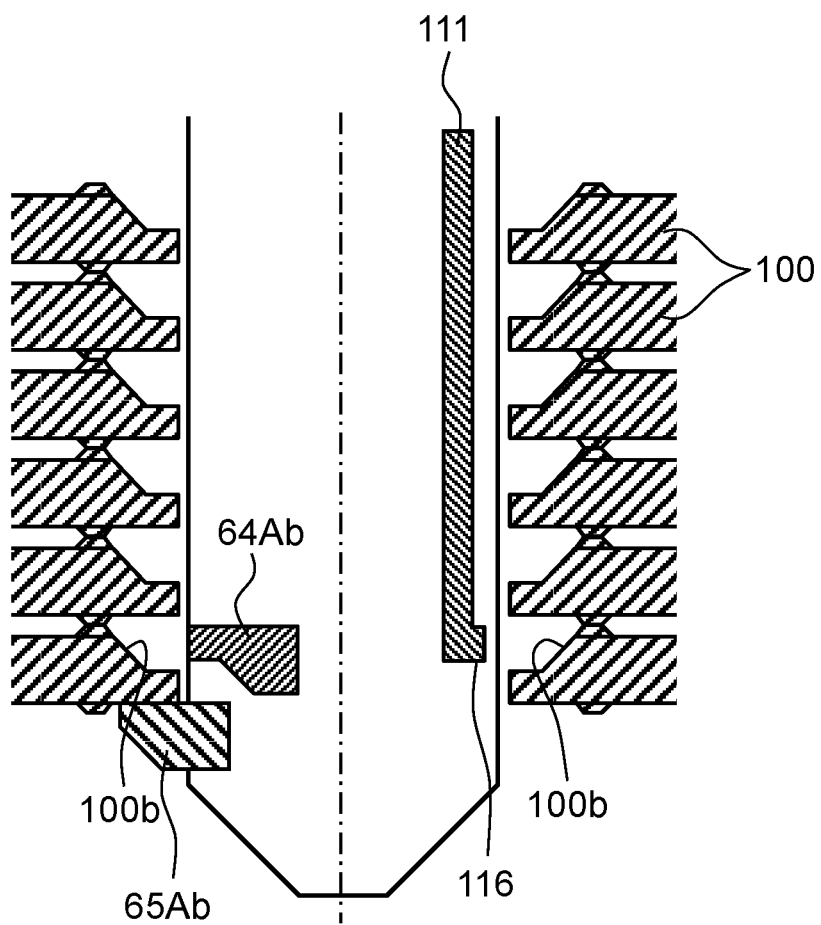
FIG. 35 is a tenth diagram schematically showing the one disc being separated from a plurality of discs by the carrier in FIG. 3.

Then, disc chuck motor 71 is further reversely driven, and cam gear 67b is further rotated in the reverse direction. Separator hooks 64A, 64B and bottom hooks 65A, 65B are thereby moved from the switching position to the supporting position, and as shown in FIG. 35, claw portions 64Ab, 64Bb of separator hooks 64A, 64B are moved to positions inside spindle shaft 66a. As a result, rest of discs 100 which were supported by the upper surfaces of claw portions 64Ab, 64Bb of separator hooks 64A, 64B are caused to fall of their own weight, and are supported by the upper surfaces of claw portions 65Ab, 65Bb of bottom hooks 65A, 65B.

Then, disc chuck motor 71 is driven, and cam gear 67b is rotated in the forward direction. Separator hooks 64A, 64B and bottom hooks 65A, 65B are thereby moved from the supporting position to the switching position, and as shown in FIG. 30, claw portions 64Ab, 64Bb of separator hooks 64A, 64B are inserted into recessed portion 100b of bottom disc 100. Also, at this time, due to rotation of cam gear 67b in the forward direction, drop shaft 111 is rotated in the forward direction, and separation claw 116 is inserted into recessed portion 100b of bottom disc 100.

Then, moving base 61 is lowered such that the plurality of discs 100 held by spindle unit 66 are positioned above, for example, immediately above, tray 4a. Disc chuck motor 71 is further driven in this state, and cam gear 67b is further rotated in the forward direction. Separator hooks 64A, 64B and bottom hooks 65A, 65B are thereby moved from the switching position to the separation position, and as shown in FIG. 31, claw portions 65Ab, 65Bb of bottom hooks 65A, 65B are moved to positions inside spindle shaft 66a. At this time, the upper surfaces of claw portions 64Ab, 64Bb of separator hooks 64A, 64B come into contact with the inner circumferential portion of disc 100 that is adjacent to bottom disc 100 to support discs 100 above bottom disc 100.

Then, disc chuck motor 71 is further driven, and cam gear 67b is further rotated in the forward direction. Upper end portion 111a of drop shaft 111 thereby moves on slope 67ba, and separation claw 116 is lowered. As a result, as shown in FIG. 32, bottom disc 100 is pushed downward by separation claw 116 and is separated from other discs 100. Bottom disc 100 which is separated falls and is placed on tray 4a.

When bottom disc 100 is placed on tray 4a, moving base 61 is raised so that spindle unit 66 and tray 4a do not come into contact with each other. Then, tray 4a is carried into disc drive 4. The loading operation for disc drive 4 at the lowest level (first level) is thereby completed. This loading operation is repeated for the second and later levels.

When the loading operation for disc drive 4 at the highest level is completed, discs 100 have been carried into all disc drives 4, and recording or reading of disc 100 carried into each disc drive 4 is enabled.

As described above, according to the disc device of present exemplary embodiment, carrier 6 includes separation claw 116 which is capable of moving forward and backward into and out of a gap between the bottom disc and a disc that is adjacent to the bottom disc, that is, recessed portion 100b of bottom disc 100, and which is capable of moving up and down. Accordingly, even if "sticking" occurs between the bottom disc and the disc that is adjacent to the bottom disc, the bottom disc may be separated from other discs by force by lowering of separation claw 116 which is moved forward into the gap. Therefore, one disc may be reliably separated from a plurality of discs.

Furthermore, in the case of a configuration where the bottom disc is separated by falling automatically, as in the case of the disc device of Unexamined Japanese Patent Publication No. 2014-13639, time is required until the bottom disc falls automatically of its own weight. Accordingly, it takes a long time for all the discs to be placed on tray 4a of disc drive 4.

On the other hand, according to the disc device of the present exemplary embodiment, the bottom disc may be separated from other discs by force by separation claw 116, a waiting time is not necessary. As a result, the time required to place all the discs on tray 4a of disc drive 4 may be reduced by 20% or more, for example.

Also, when "sticking" occurs between the bottom disc and a disc that is adjacent to the bottom disc, the gap between the discs is reduced. This gap is smaller on the outer circumferential side of the discs than on the inner circumferential side. Accordingly, separation claw 116 may not be inserted even if separation claw 116 is to be inserted from the outer circumferential side of the discs.

On the other hand, according to the disc device of the present exemplary embodiment, separation claw 116 is configured to push the inner circumferential portion of the bottom disc downward. Separation claw 116 may thereby be more reliably inserted into the gap between the bottom disc and the disc that is adjacent to the bottom disc. Accordingly, the bottom disc may be more reliably separated from other discs. Also, separation claw 116 may easily separate the bottom disc from other discs by a smaller amount of lowering compared to a case where the outer circumferential portion of the bottom disc is to be pushed downward.

Furthermore, according to the disc device of the present exemplary embodiment, separator hooks 64A, 64B, bottom hooks 65A, 65B, and separation claw 116 are disposed in spindle unit 66 which is to be inserted into center hole 100a provided to each of a plurality of discs 100. This suppresses an increase in the size of the device, and also, a stable, low-cost mechanism with less timing error can be realized according to which separator hooks 64A, 64B, bottom hooks 65A, 65B, and separation claw 116 are driven by the same driving source.

Also, in the case of separating discs that are stuck together, separation is easier when separating force is applied at shifted positions than when the separating force is applied to the discs at balanced positions such as at the time of separating two magnets stuck together by a magnetic force. Therefore, according to the disc device of the present exemplary embodiment, the inner circumferential portion of the bottom disc is pushed downward by single separation claw 116. This allows the bottom disc to be easily separated from other discs. Also, an increase in the number of parts and an increase in the cost may be suppressed.

Additionally, the present disclosure is not limited to the exemplary embodiment described above, and various other embodiments are allowed. For example, separator hooks 64A, 64B and separation claw 116 are separately provided, but the present disclosure is not limited to such a case. For example, one of separator hooks 64A, 64B may be structured to be capable of moving up and down, and the bottom disc may be separated from other discs by the separator hook. That is, one of separator hooks 64A, 64B may be used also as the separation claw.

Furthermore, the bottom disc is to be separated from other discs by lowering of separation claw 116 while separation claw 116 is positioned between the gap between the bottom disc and the disc that is adjacent to the bottom disc, but the present disclosure is not limited to such a case. For example, a tip end portion of separation claw 116 may be formed as a wedge, and the bottom disc may be separated from other discs by separation claw 116 moving further into the gap from a state where separation claw 116 is positioned in the gap. That is, it is sufficient if separation claw 116 is capable of pushing the bottom disc downward.

Additionally, in the exemplary embodiment described above, the inner circumferential portion of the bottom disc is pushed downward by single separation claw 116, but the present disclosure is not limited to such a case. In the case where the inner circumferential portion of the bottom disc is pushed downward by single separation claw 116, strong separating force acts unevenly on the disc, possibly causing the disc to vertically fluctuate. In this case, separator hooks 64A, 64B and separation claw 116 may not be correctly inserted into the gap between adjacent discs. Accordingly, for example, two or more separation claws 116 may be used to push the inner circumferential portion of the bottom disc downward. This allows the fluctuation of the disc to be suppressed.

Furthermore, a disc fluctuation suppression unit for suppressing fluctuation of a plurality of discs 100 held by carrier 6 by coming into contact with a part of the plurality of discs 100 may be provided. In the following, a specific example structure of the disc fluctuation suppression unit will be described.

Figure 36:
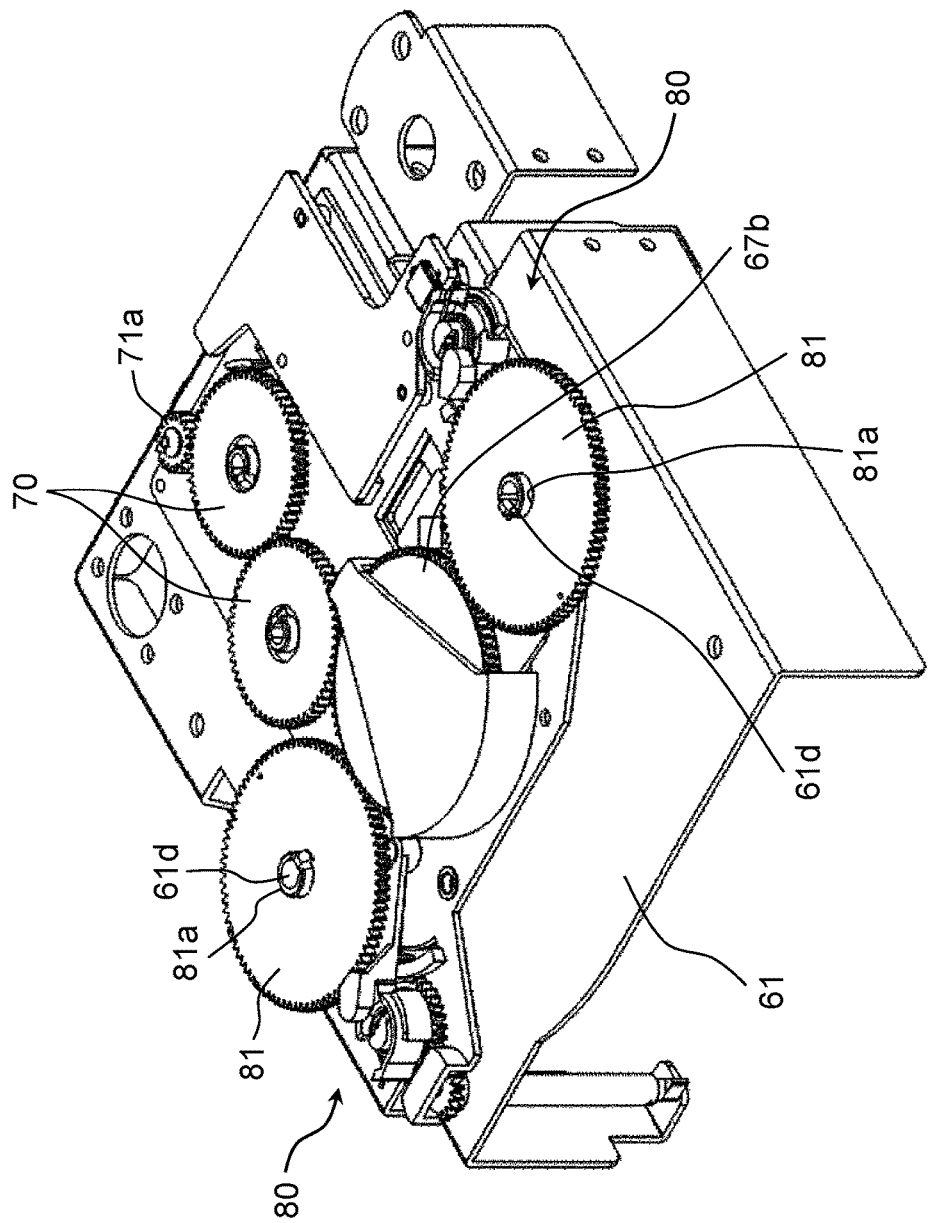
FIG. 36 is a perspective view showing an example configuration of a disc fluctuation suppression unit of a disc device according to an exemplary embodiment of the present disclosure.
Figure 37:
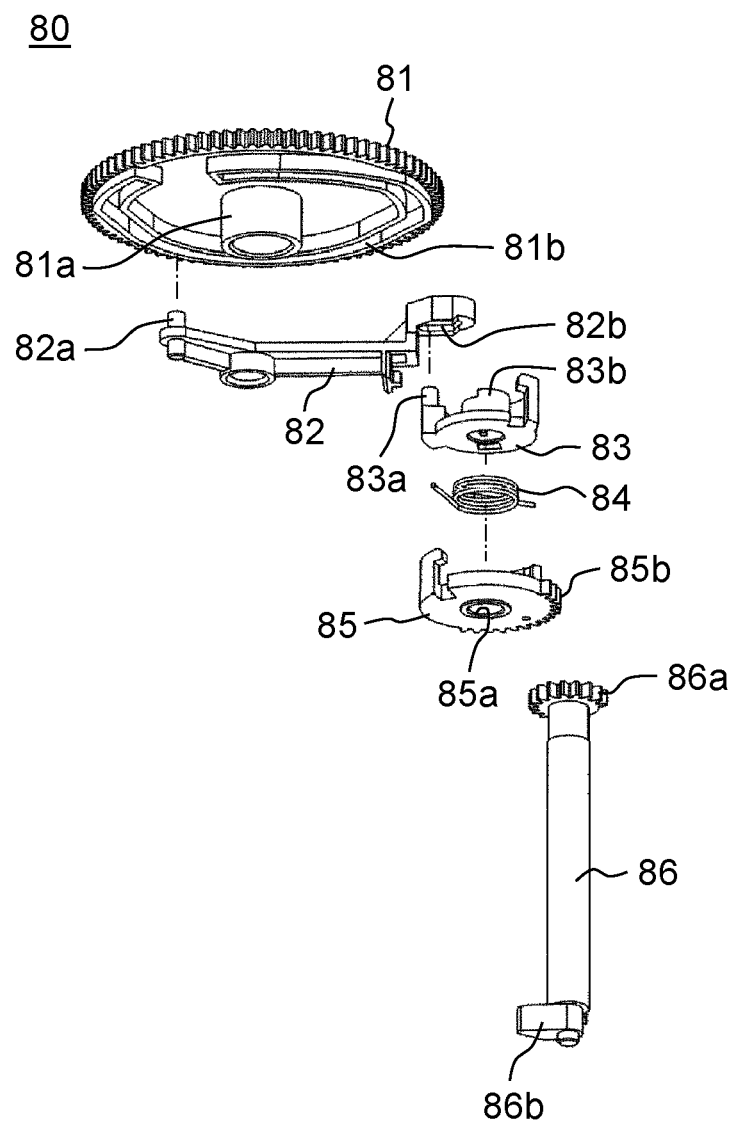
FIG. 37 is an exploded perspective view showing a structure of the disc fluctuation suppression unit in FIG. 36.

FIG. 36 is a perspective view showing an example configuration of a disc fluctuation suppression unit of a disc device according to an exemplary embodiment of the present disclosure, and FIG. 37 is a perspective view showing a structure of the disc fluctuation suppression unit in FIG. 36. As shown in FIG. 36, two disc fluctuation suppression units 80 are provided to moving base 61. As shown in FIG. 37, each disc fluctuation suppression unit 80 includes cam gear 81, link lever 82, torque limiter 83, coil torsion spring 84, outer circumferential claw drive gear 85, and shaft 86.

As shown in FIG. 36, rotation shaft hole 81a is provided at a center portion of cam gear 81. Rotation shaft 61d provided to moving base 61 is inserted into rotation shaft hole 81a. Cam gear 81 is meshed with cam gear 67b. Accordingly, when disc chuck motor 71 is driven and cam gear 67b is rotated, each cam gear 81 is also rotated.

As shown in FIG. 37, cam groove 81b is provided on a rear surface of cam gear 81. Pin portion 82a provided to one end portion of link lever 82 is engaged with cam groove 81b. When cam gear 81 is rotated, pin portion 82a moves along cam groove 81b. Groove portion 82b is provided to the other end portion of link lever 82. Pin portion 83a provided to torque limiter 83 is engaged with groove portion 82b. Coil torsion spring 84 and outer circumferential claw drive gear 85 are attached to torque limiter 83.

Figure 38:
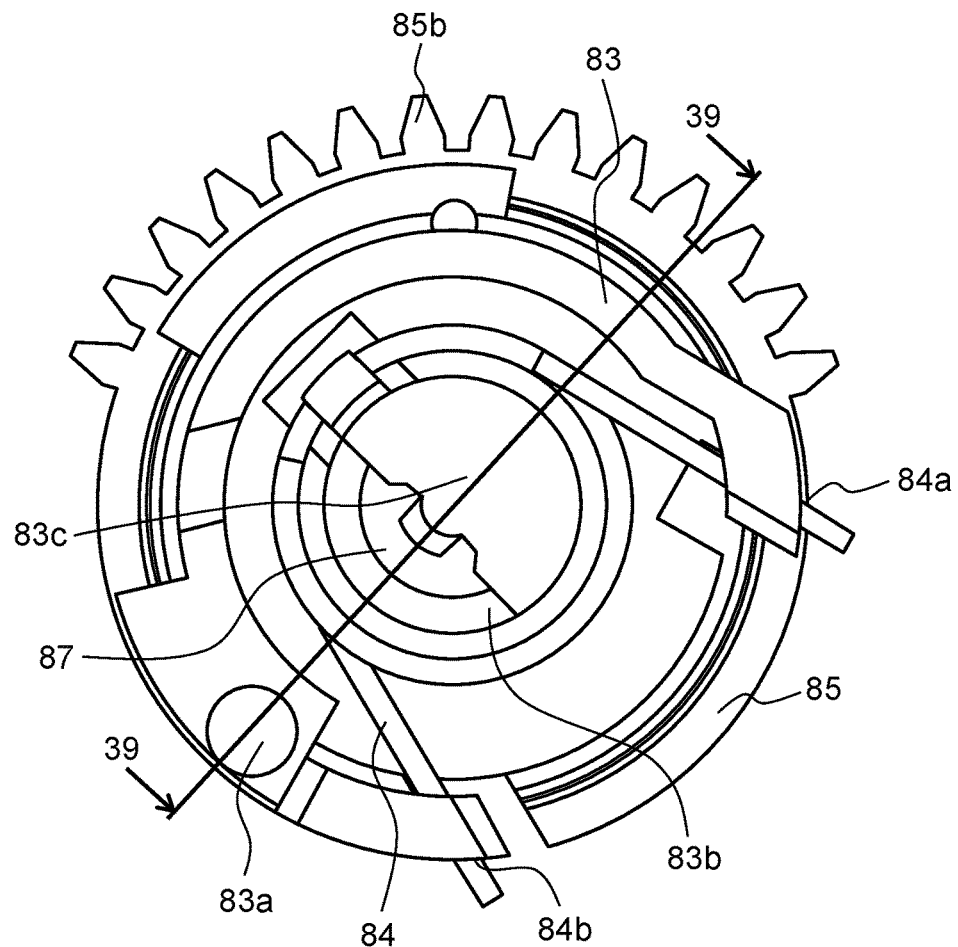
FIG. 38 is a plan view showing an attached state of a torque limiter, a coil torsion spring, and an outer circumferential claw drive gear provided to the disc fluctuation suppression unit in FIG. 37.
Figure 39:
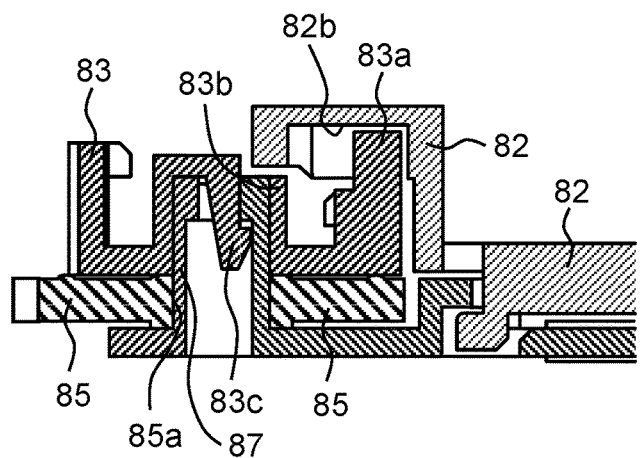
FIG. 39 is a cross-sectional view along the line 39-39 in FIG. 38.

FIG. 38 is a plan view showing an attached state of torque limiter 83, coil torsion spring 84, and outer circumferential claw drive gear 85. FIG. 39 is a cross-sectional view along the line 39-39 in FIG. 38, and is a partial enlarged cross-sectional view showing an attached state of link lever 82, torque limiter 83, and outer circumferential claw drive gear 85.

As shown in FIGS. 38 and 39, circular cylindrical portion 83b is provided protruding upward at a center portion of torque limiter 83. As shown in FIG. 39, engaging portion 83c for engaging with an upper portion of gear shaft 87 that is inserted inside circular cylindrical portion 83b is provided at an upper portion of circular cylindrical portion 83b. When engaging portion 83c is engaged with the upper portion of gear shaft 87, torque limiter 83 is enabled to rotate around gear shaft 87.

As shown in FIG. 37, gear shaft hole 85a is provided at a center portion of outer circumferential claw drive gear 85. As shown in FIG. 39, when gear shaft 87 is inserted in gear shaft hole 85a, outer circumferential claw drive gear 85 is enabled to rotate around gear shaft 87.

As shown in FIG. 38, coil torsion spring 84 is wound around circular cylindrical portion 83b, and one end portion 84a is engaged with torque limiter 83, and other end portion 84b is engaged with outer circumferential claw drive gear 85. Torque limiter 83 is biased, by coil torsion spring 84, in a certain turning direction with respect to outer circumferential claw drive gear 85.

Gear portion 85b is provided at a part of an outer circumferential surface of outer circumferential claw drive gear 85.

Figure 40:
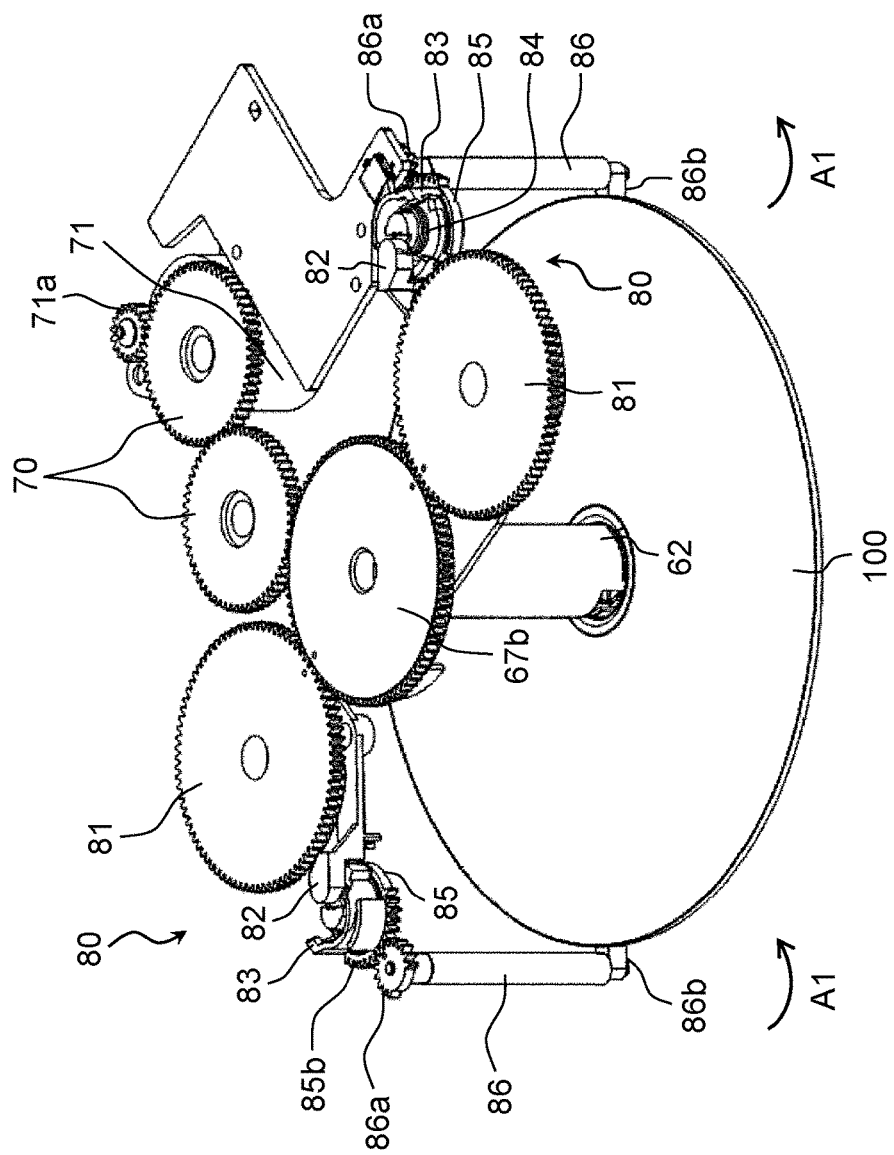
FIG. 40 is a perspective view showing a positional relationship among a disc chuck unit, the disc fluctuation suppression units, and a disc.
Figure 41:
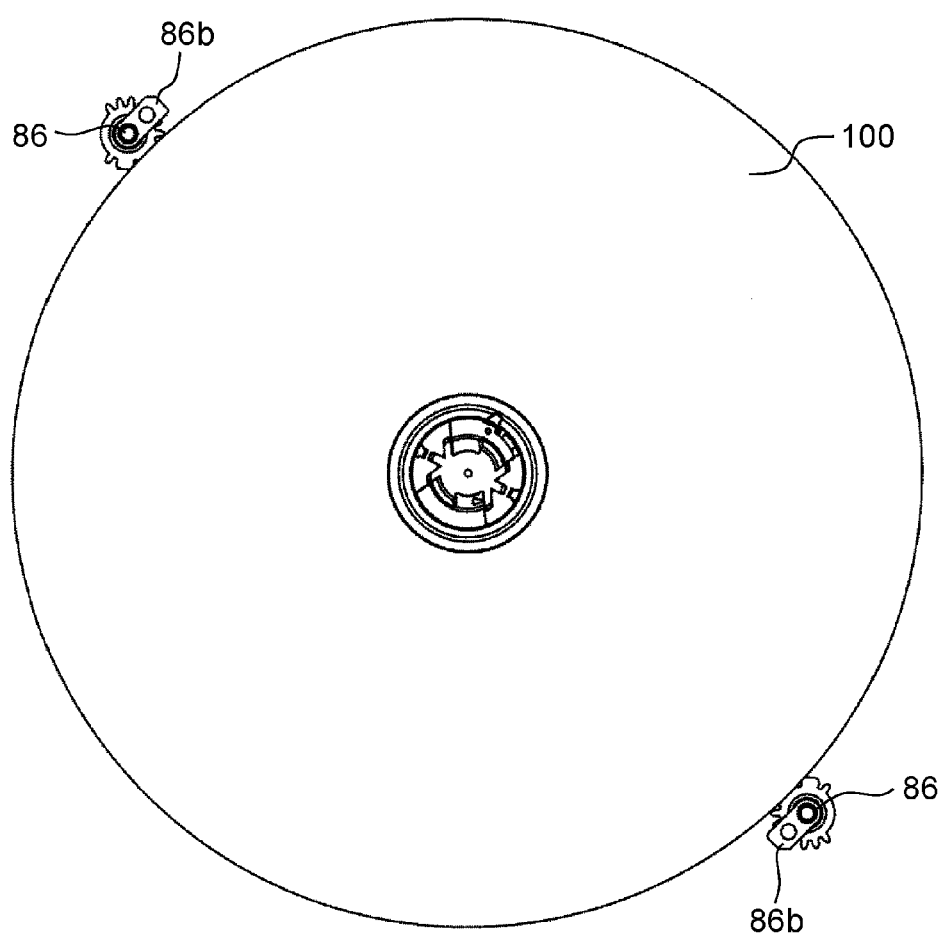
FIG. 41 is a bottom view showing a state where outer circumferential claws provided to the disc fluctuation suppression units in FIG. 37 are at a standby position.
Figure 42:
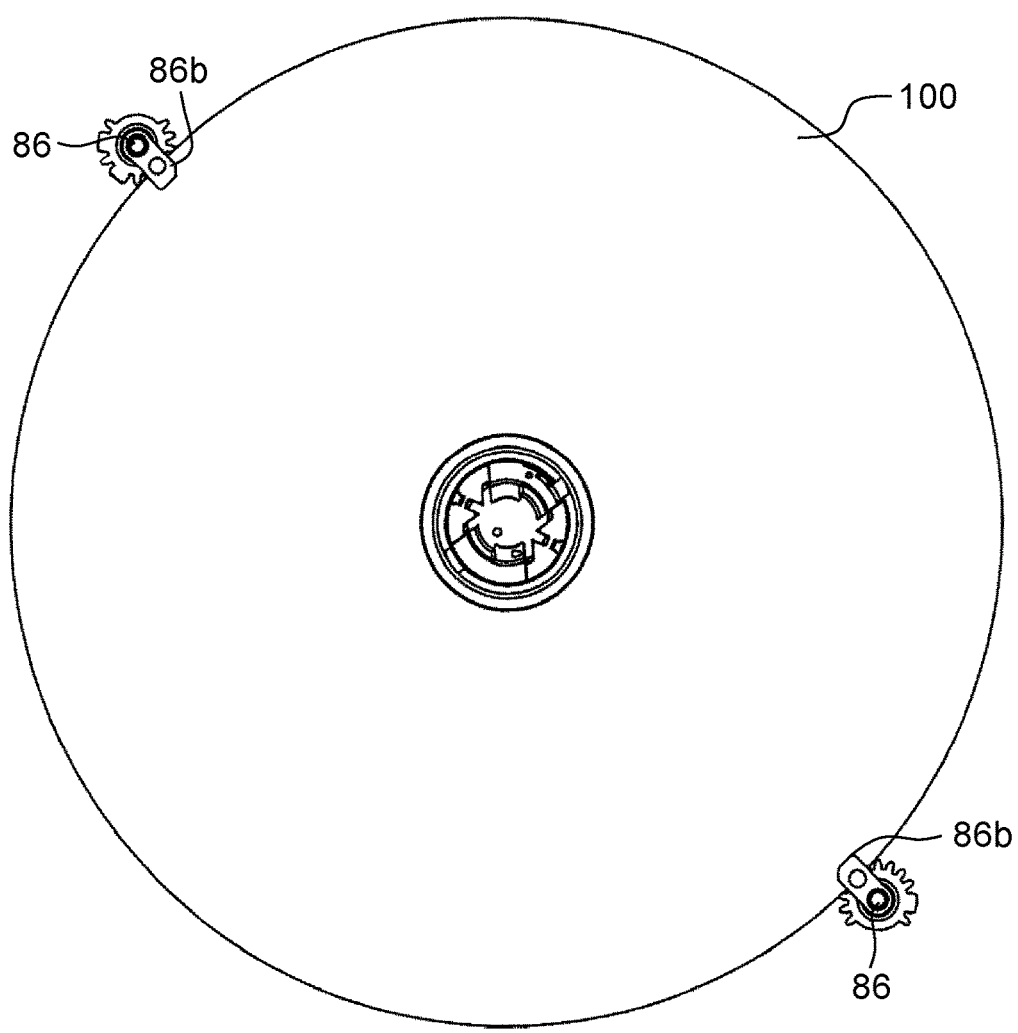
FIG. 42 is a bottom view showing a state where the outer circumferential claws of the disc fluctuation suppression units in FIG. 37 are at an outer circumference supporting position.

FIG. 40 is a perspective view showing a positional relationship among disc chuck unit 62, disc fluctuation suppression units 80, and disc 100, FIG. 41 is a bottom view showing a state where outer circumferential claws 86b provided to disc fluctuation suppression units 80 in FIG. 37 are at a standby position, and FIG. 42 is a bottom view showing a state where outer circumferential claws 86b of disc fluctuation suppression units 80 in FIG. 37 are at an outer circumference supporting position.

As shown in FIG. 40, gear portion 85b is capable of being meshed with gear portion 86a that is provided at an upper portion of shaft 86.

Shaft 86 extends in the thickness direction of a disc, and gear portion 86a is capable of turning around the axis of shaft 86. Outer circumferential claw 86b is provided at a lower portion of shaft 86 in a manner protruding from an outer circumferential surface of shaft 86.

Outer circumferential claw 86b is provided in such a manner that when shaft 86 turns in the direction of arrow A1 (also referred to as the forward direction) around the axis, outer circumferential claw 86b is moved from the standby position away from disc 100 as shown in FIG. 41 to the outer circumference supporting position of supporting an outer circumferential portion (for example, a lower surface) of bottom disc 100 as shown in FIG. 42. When outer circumferential claw 86b is moved from the standby position to the outer circumference supporting position, outer circumferential claw 86b comes into contact with the outer circumferential portion of the bottom disc to suppress fluctuation of the disc. Moreover, fluctuation of the disc may be more effectively suppressed when outer circumferential claw 86b comes into contact with the outer circumferential portion of the bottom disc, and not the inner circumferential portion.

Additionally, it is sufficient if outer circumferential claws 86b are at the outer circumference supporting position when separator hooks 64A, 64B and bottom hooks 65A, 65B are at the supporting position or the switching position. An effect of suppressing fluctuation of discs 100 may thereby be achieved.

On the other hand, if outer circumferential claws 86b are at the outer circumference supporting position when separator hooks 64A, 64B and bottom hooks 65A, 65B are at the storage position, lowering of moving base 61 is prevented by outer circumferential claws 86b. Also, if outer circumferential claws 86b are at the outer circumference supporting position when separator hooks 64A, 64B and bottom hooks 65A, 65B are at the separation position, the bottom disc may be prevented from falling by outer circumferential claws 86b. Accordingly, outer circumferential claws 86b are to be at the standby position when separator hooks 64A, 64B and bottom hooks 65A, 65B are at the storage position or the separation position.

Additionally, a configuration where two disc fluctuation suppression units 80 are provided to moving base 61 is described above, but the present disclosure is not limited to such a case. A number of disc fluctuation suppression units 80 may be such that a plurality of discs 100 may be held horizontally. That is, one or three or more disc fluctuation suppression units 80 may be provided.

The present disclosure allows one disc to be reliably separated from a plurality of discs, and is especially useful for a disc device for supplying a plurality of discs to a plurality of disc drives.

What is claimed is:

1. A disc device for supplying a disc to each of a plurality of disc drives, the disc device comprising a carrier for retaining a plurality of discs in a stacked state, for separating one disc from the retained plurality of discs above a tray that is ejected from an arbitrary disc drive, and for placing the separated one disc on the tray, wherein the carrier includes
a first support claw that is capable of moving forward and backward below the plurality of discs,
a second support claw that is capable of moving forward and backward into and out of a gap between a bottom disc and a disc that is adjacent to the bottom disc, among the plurality of discs, and
a separation claw that is capable of moving forward and backward into and out of the gap and of pushing the bottom disc downward, and wherein the bottom disc is separated from the retained plurality of discs by moving the first support claw, the second support claw, and the separation claw forward and backward, and pushing the bottom disc downward by the separation claw.

2. The disc device according to claim 1, wherein, when the first support claw is retracted from below the plurality of discs, and the separation claw and the second support claw are positioned in the gap, the separation claw pushes the bottom disc downward and separates one disc from the plurality of discs.

3. The disc device according to claim 1, wherein the separation claw is capable of moving in an up-and-down direction relative to the second support claw.

4. The disc device according to claim 3, wherein, when the first support claw is retracted from below the plurality of discs, and the separation claw and the second support claw are positioned in the gap, the separation claw moves downward and separates the bottom disc.

5. The disc device according to claim 1, wherein the separation claw pushes downward an inner circumferential portion of the bottom disc.

6. The disc device according to claim 1,
wherein the carrier further includes a spindle unit that is to be inserted in a center hole provided to each of the plurality of discs, and
wherein one disc is separated from the retained plurality of discs by moving the first support claw, the second support claw, and the separation claw forward and backward between inside and outside of the spindle unit, and pushing the bottom disc downward by the separation claw.

7. The disc device according to claim 1, wherein the separation claw is formed as a single claw.

8. The disc device according to claim 1, comprising a disc fluctuation suppression unit for suppressing fluctuation of the plurality of discs by coming into contact with a part of the plurality of discs held by the carrier.

9. The disc device according to claim 8, wherein the disc fluctuation suppression unit suppresses fluctuation of the plurality of discs by coming into contact with an outer circumferential portion of the plurality of discs held by the carrier.

10. The disc device according to claim 8, wherein a plurality of the disc fluctuation suppression units are provided.

11. A disc separation method for separating one disc from a plurality of discs that are stacked together, the method comprising:
moving a second support claw and a separation claw forward into a gap between a bottom disc and a disc that is adjacent to the bottom disc, among the plurality of discs, and then retracting a first support claw supporting the plurality of discs from below from below the plurality of discs; and
separating the bottom disc from the plurality of discs by moving the separation claw relative to the second support claw and pushing the bottom disc downward.

* * * * *